US006305448B1

(12) United States Patent
Ota et al.

(10) Patent No.: US 6,305,448 B1
(45) **Date of Patent: *Oct. 23, 2001**

(54) LATHE CHARGER

(75) Inventors: Takashi Ota; Tsuyoshi Nakamura, both of Ohbu (JP)

(73) Assignee: Meinan Machinery Works, Inc., Aichi-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/129,277

(22) Filed: Aug. 5, 1998

(30) Foreign Application Priority Data

Aug. 21, 1997 (JP) .................................................. 9-225376

(51) Int. Cl.[7] ................................ B27L 5/02; B27B 1/00; B23Q 15/00

(52) U.S. Cl. .................................... 144/215.2; 144/209.1; 144/357; 144/365; 82/124; 250/559.25; 700/167

(58) Field of Search ................................ 144/215.2, 357, 144/382, 403, 408, 209.1; 250/559.25; 82/148, 17, 124; 700/167, 192; 702/169

(56) References Cited

U.S. PATENT DOCUMENTS

| | | | | |
|---|---|---|---|---|
| 4,197,888 | * | 4/1980 | McGee et al. | 144/215.2 X |
| 4,378,829 | * | 4/1983 | Sohn | 144/357 |
| 4,384,601 | | 5/1983 | Richert | 144/357 |
| 4,867,213 | * | 9/1989 | Bolton et al. | 144/357 |
| 4,884,605 | * | 12/1989 | Ely | 144/357 |
| 4,949,769 | * | 8/1990 | Cameron | 144/245.2 |
| 4,965,734 | * | 10/1990 | Edwards et al. | 700/167 X |
| 5,067,534 | * | 11/1991 | Toivo | 144/215.2 |
| 5,421,385 | * | 6/1995 | McGee | 144/357 |
| 5,449,030 | * | 9/1995 | Mutsuura et al. | 144/357 |
| 5,518,052 | * | 5/1996 | Westberg et al. | 144/398 |

FOREIGN PATENT DOCUMENTS 460001 8/1992 (JP) .

* cited by examiner

*Primary Examiner*—W. Donald Bray
(74) *Attorney, Agent, or Firm*—Pearson & Pearson, LLP

(57) ABSTRACT

To make coincide cutting centers of two end surfaces of raw wood with the axis of spindles of a veneer lathe, at least two axial corrections which are performed in a state in which the raw wood is held by centering spindles are required. Conventional apparatuses suffer from too complicated structures and enlargement of the cost because of the complicated structures. A correction operation of an axial direction of correction operations in the two axial directions is performed such that only a movable centering spindle is moved in a direction intersecting a direction in which holding arms are extended/contracted. Another correction operation in another axial direction is performed by extending/contracting the holding arms.

3 Claims, 25 Drawing Sheets

[FIG. 1]
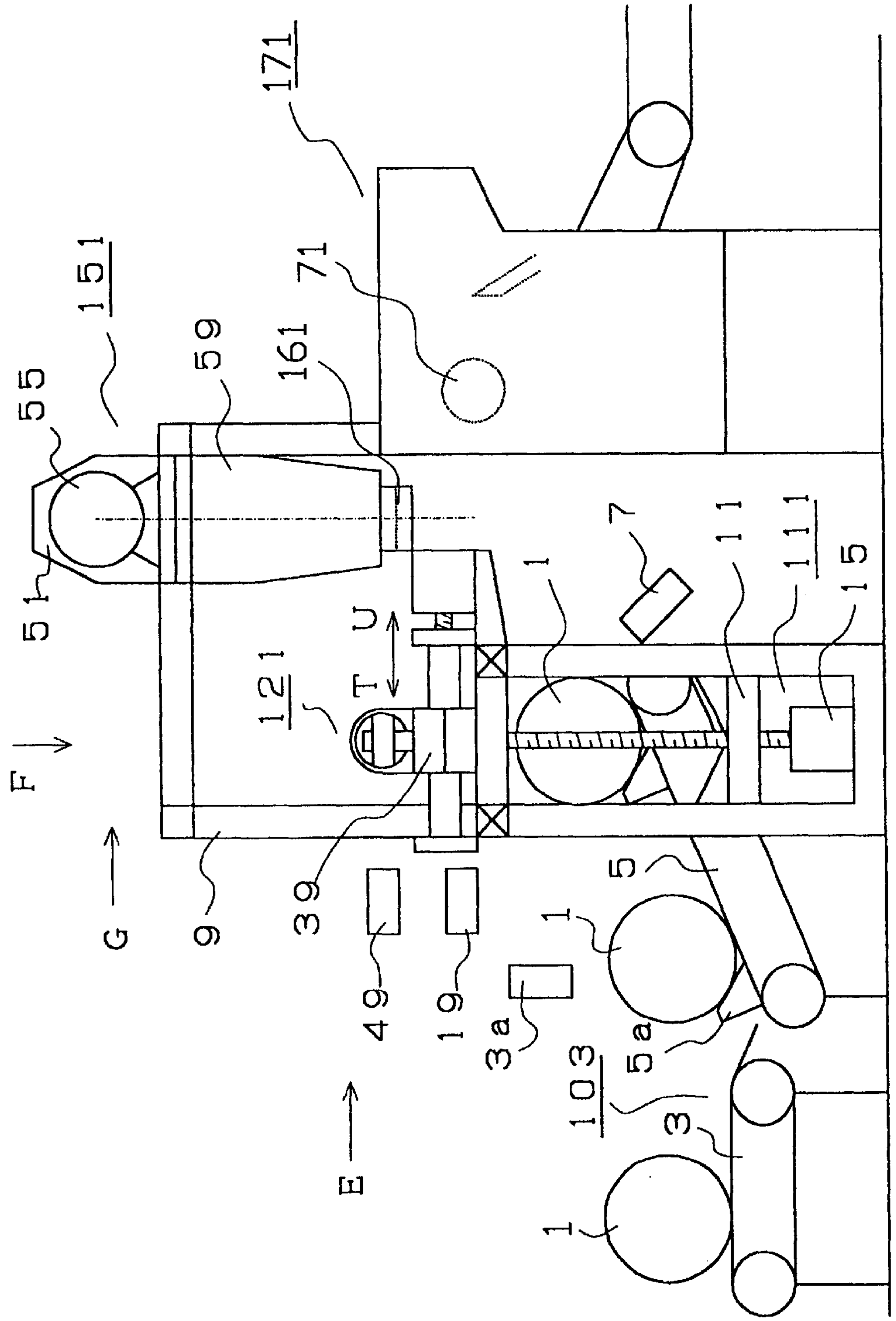

[FIG. 2]
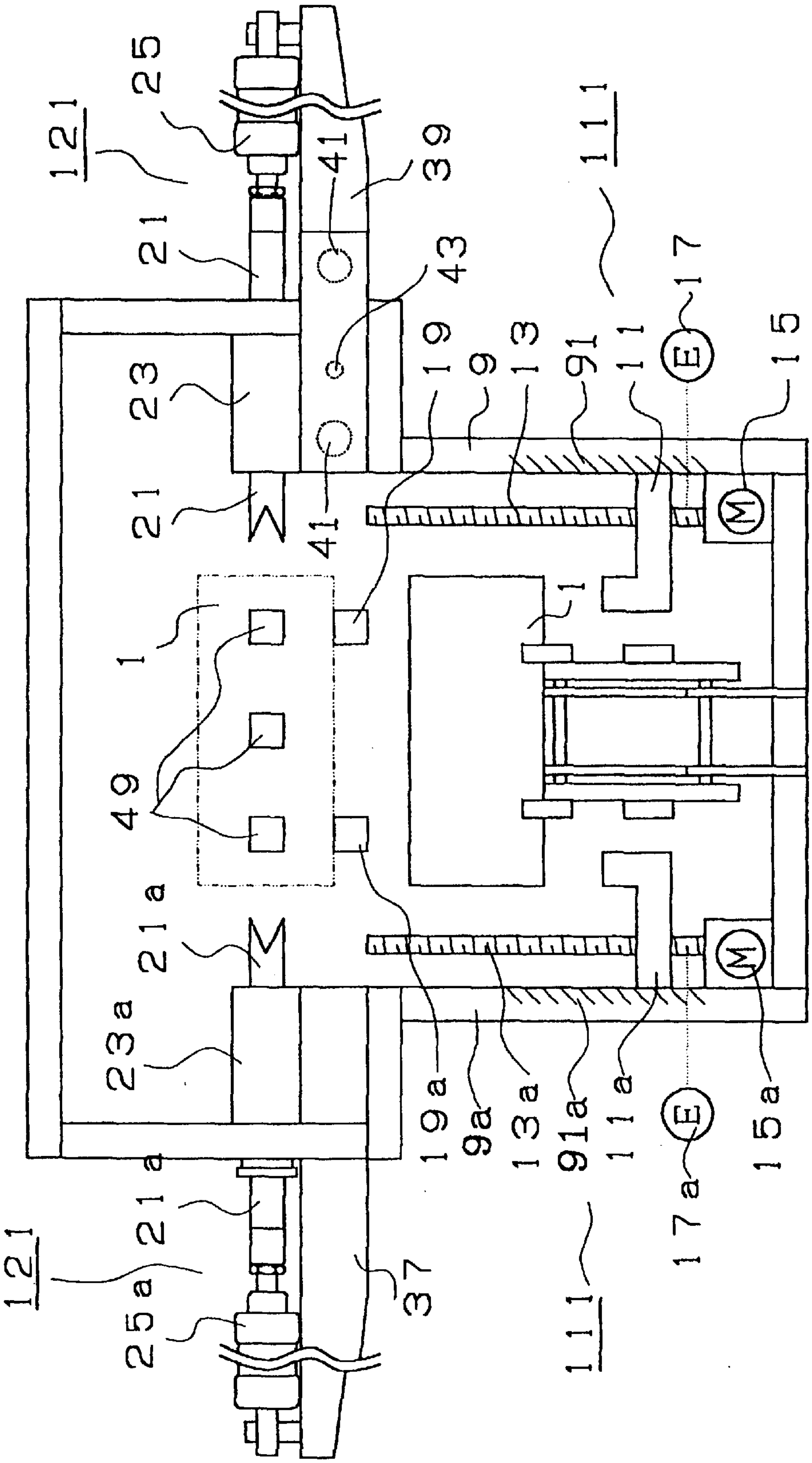

[FIG. 3]
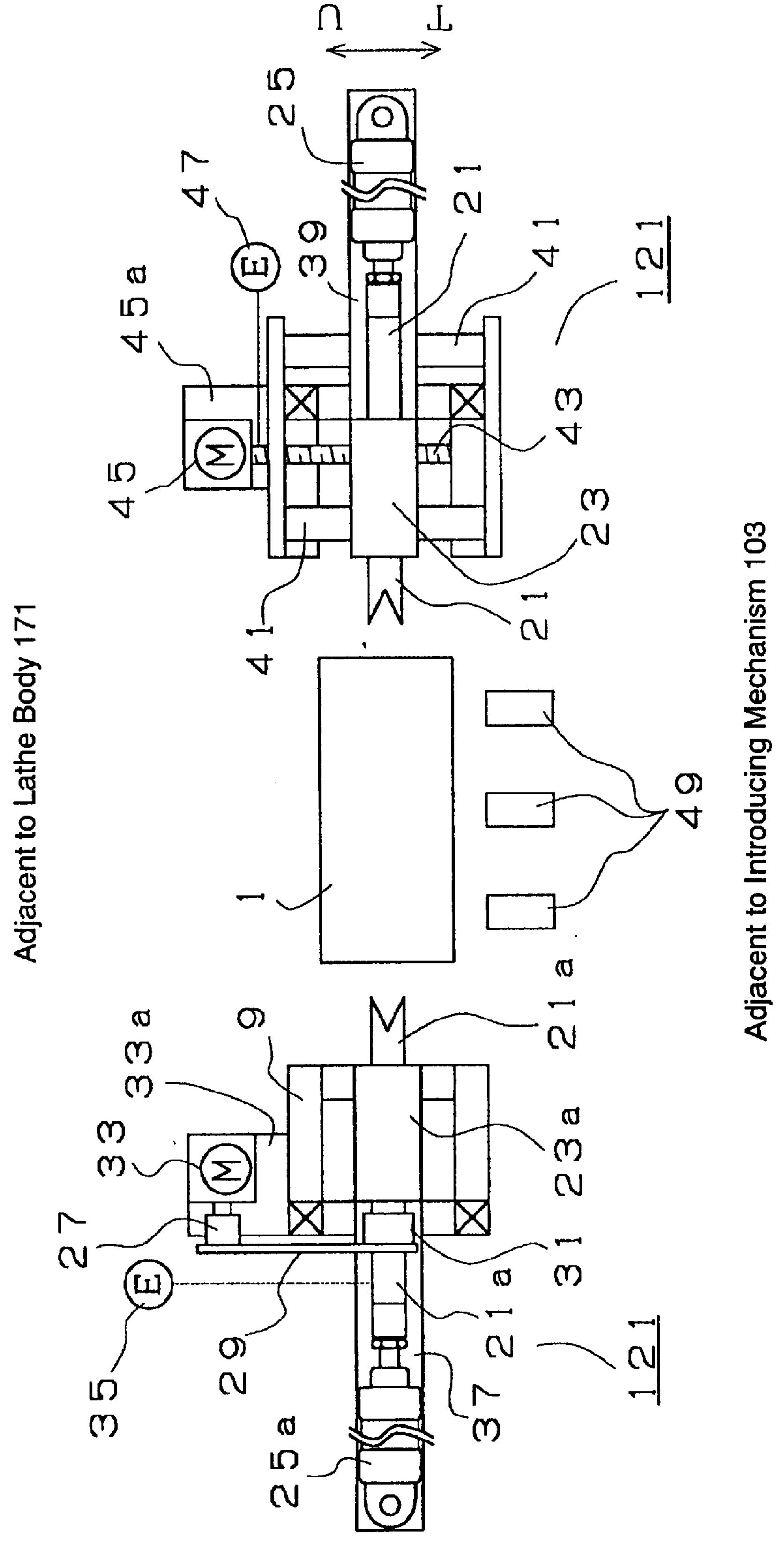

[FIG. 4]
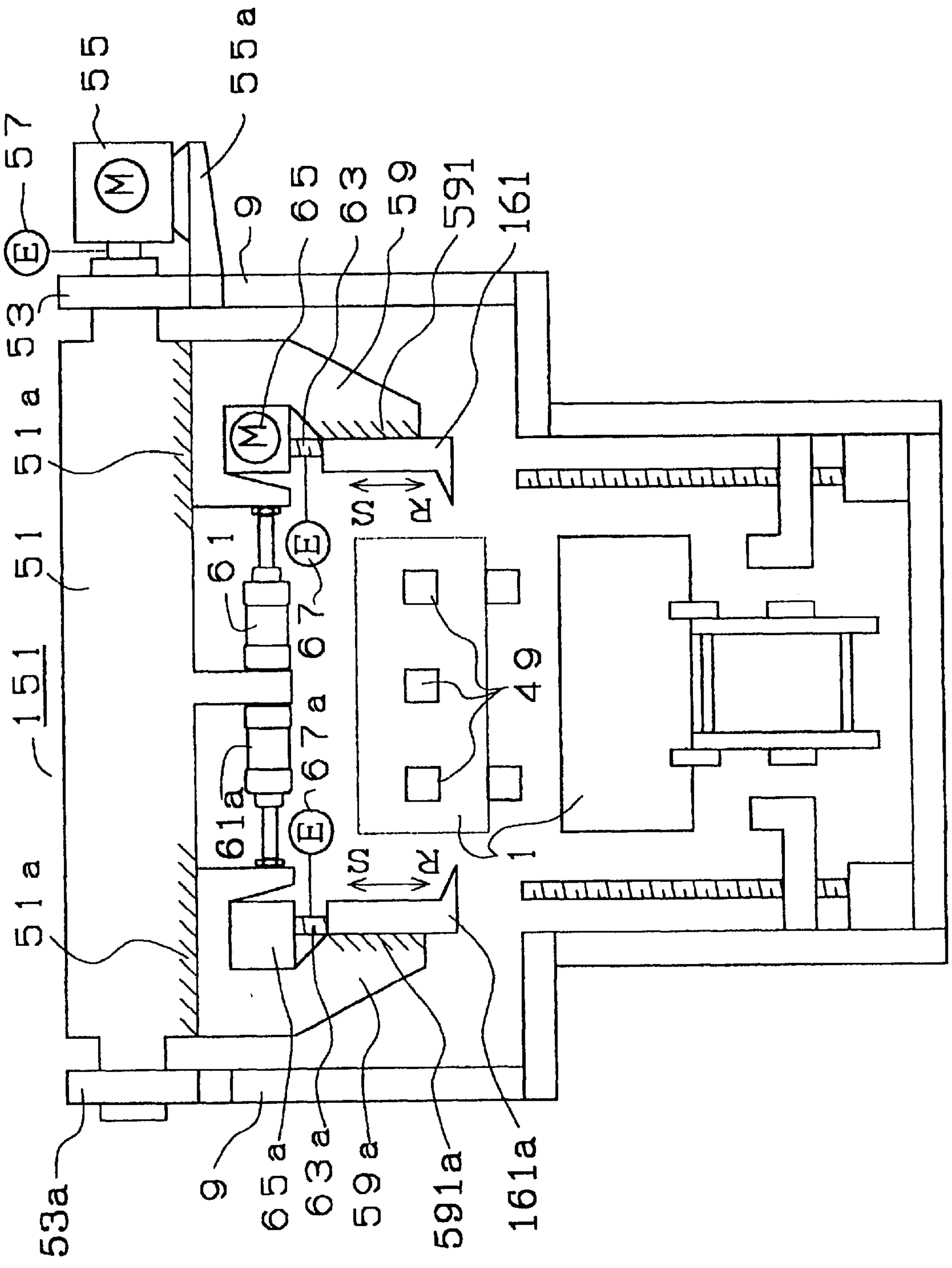

[FIG. 5]
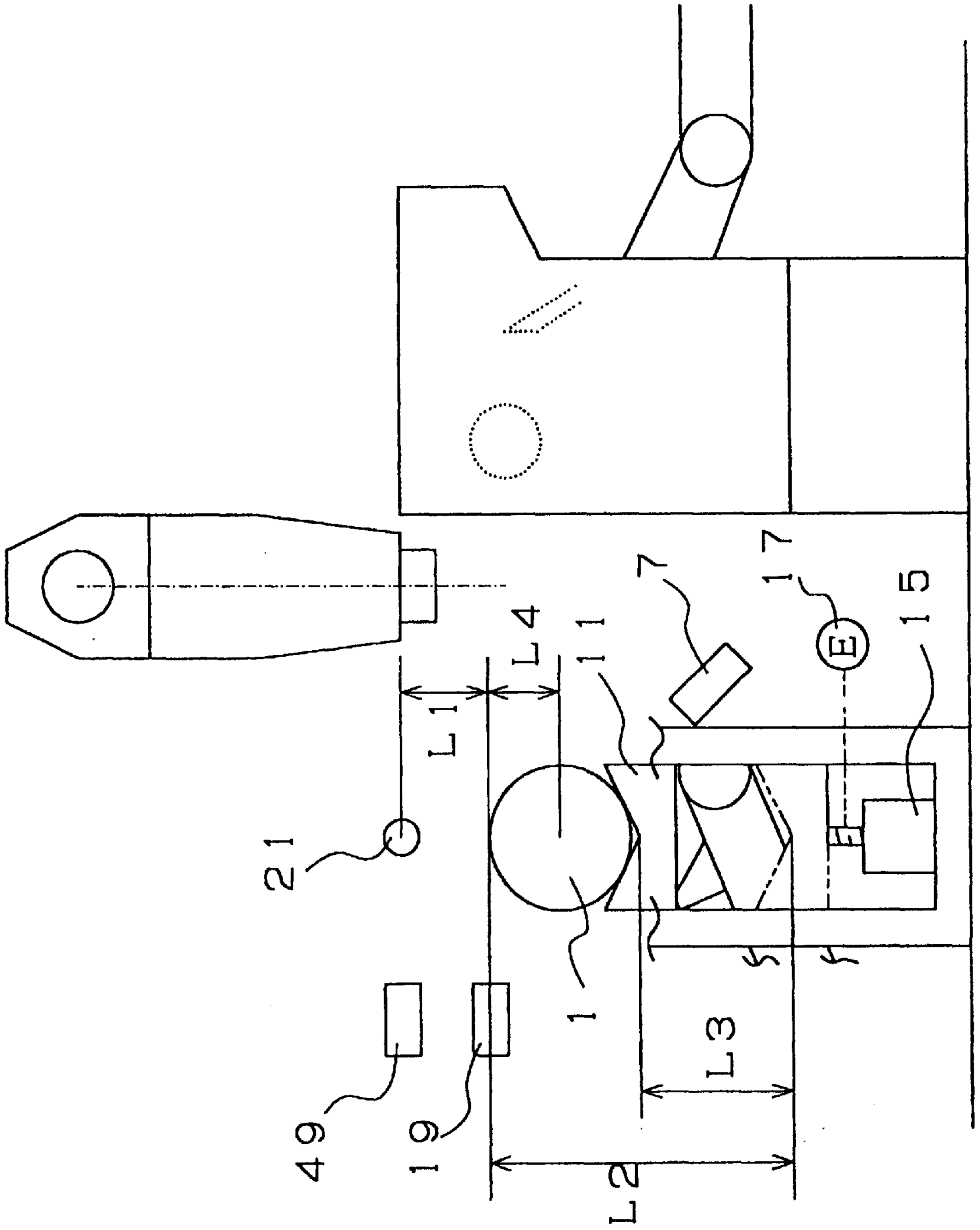

[FIG. 6]
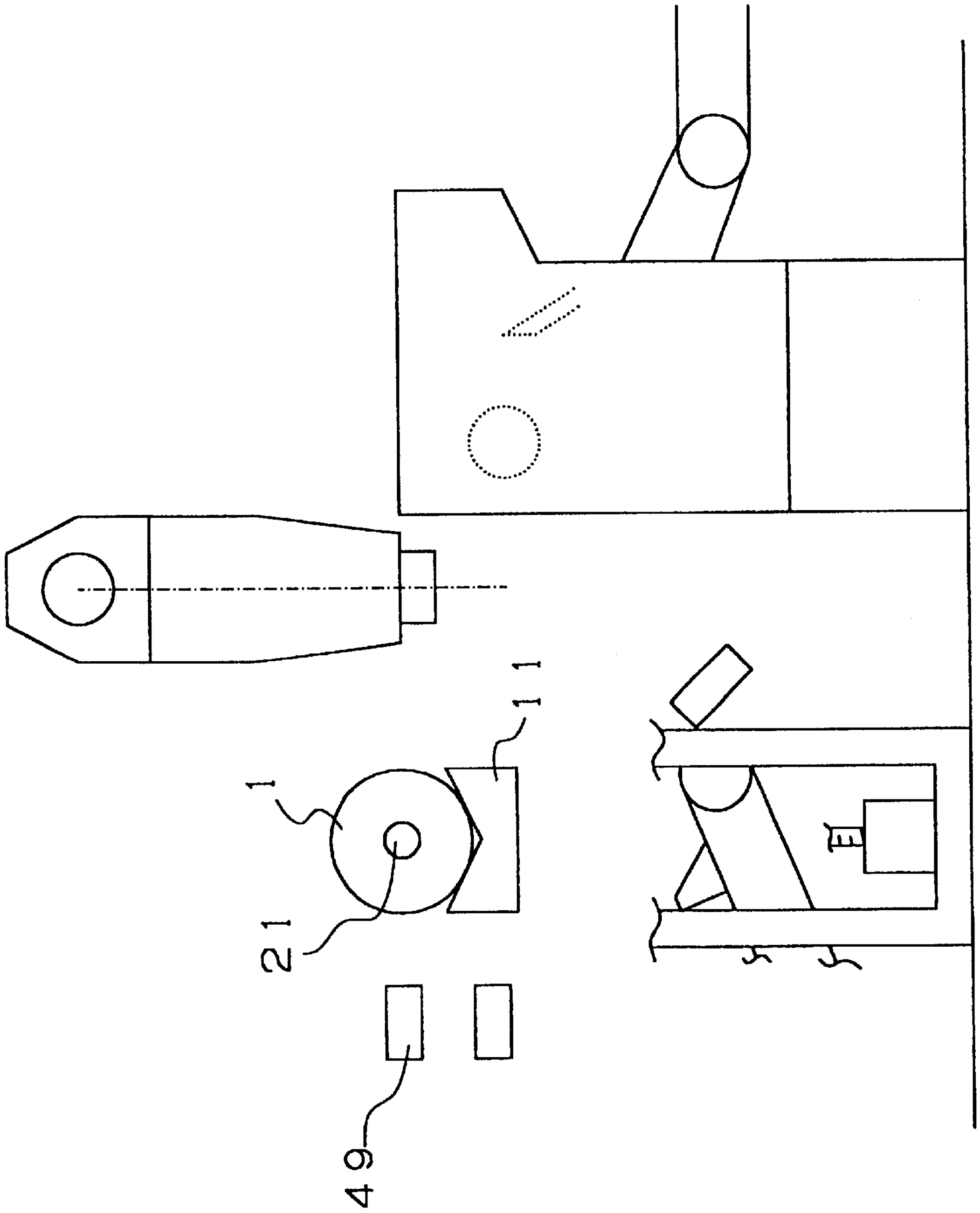

[FIG. 7]
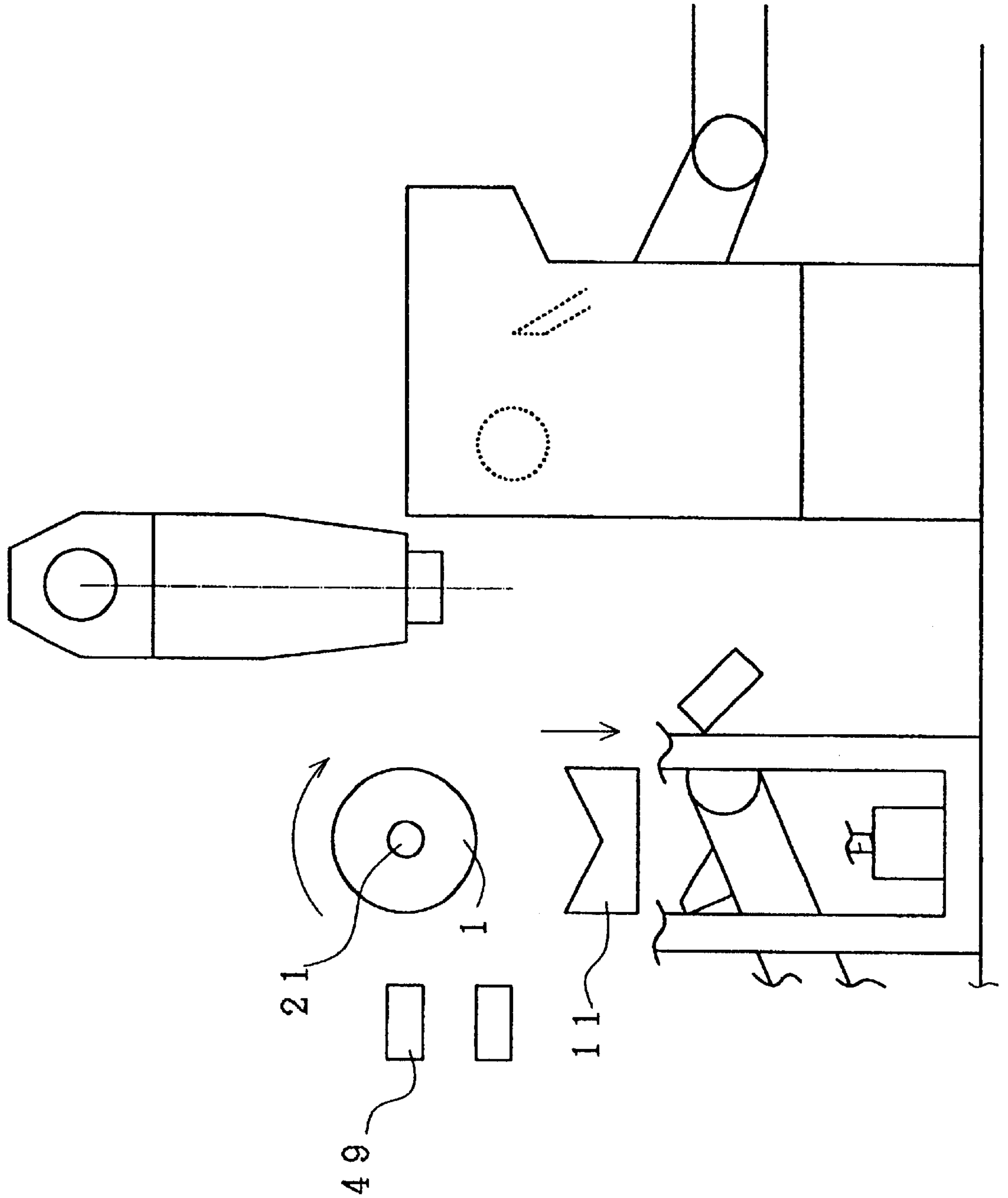

[FIG. 8]
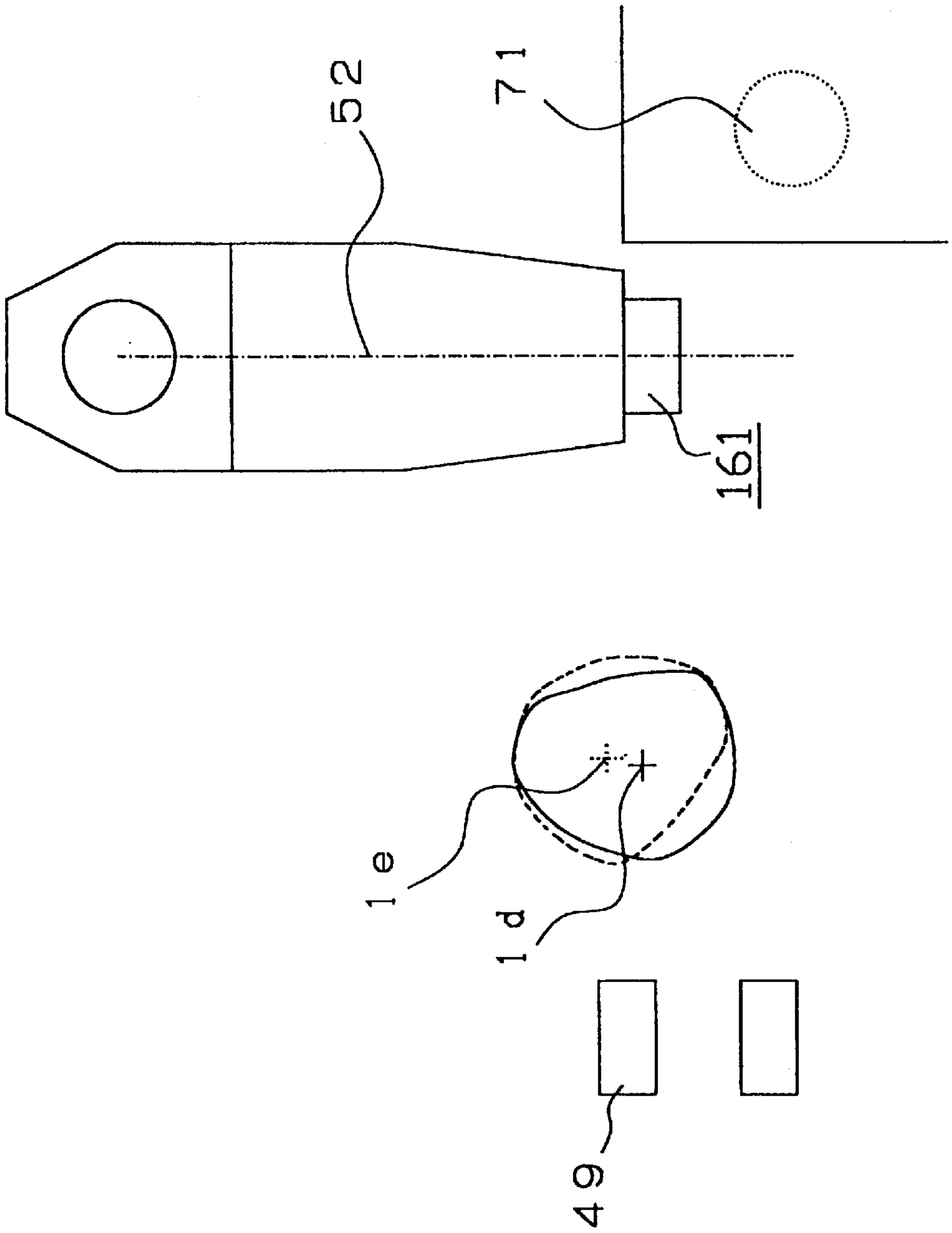

[FIG. 9]
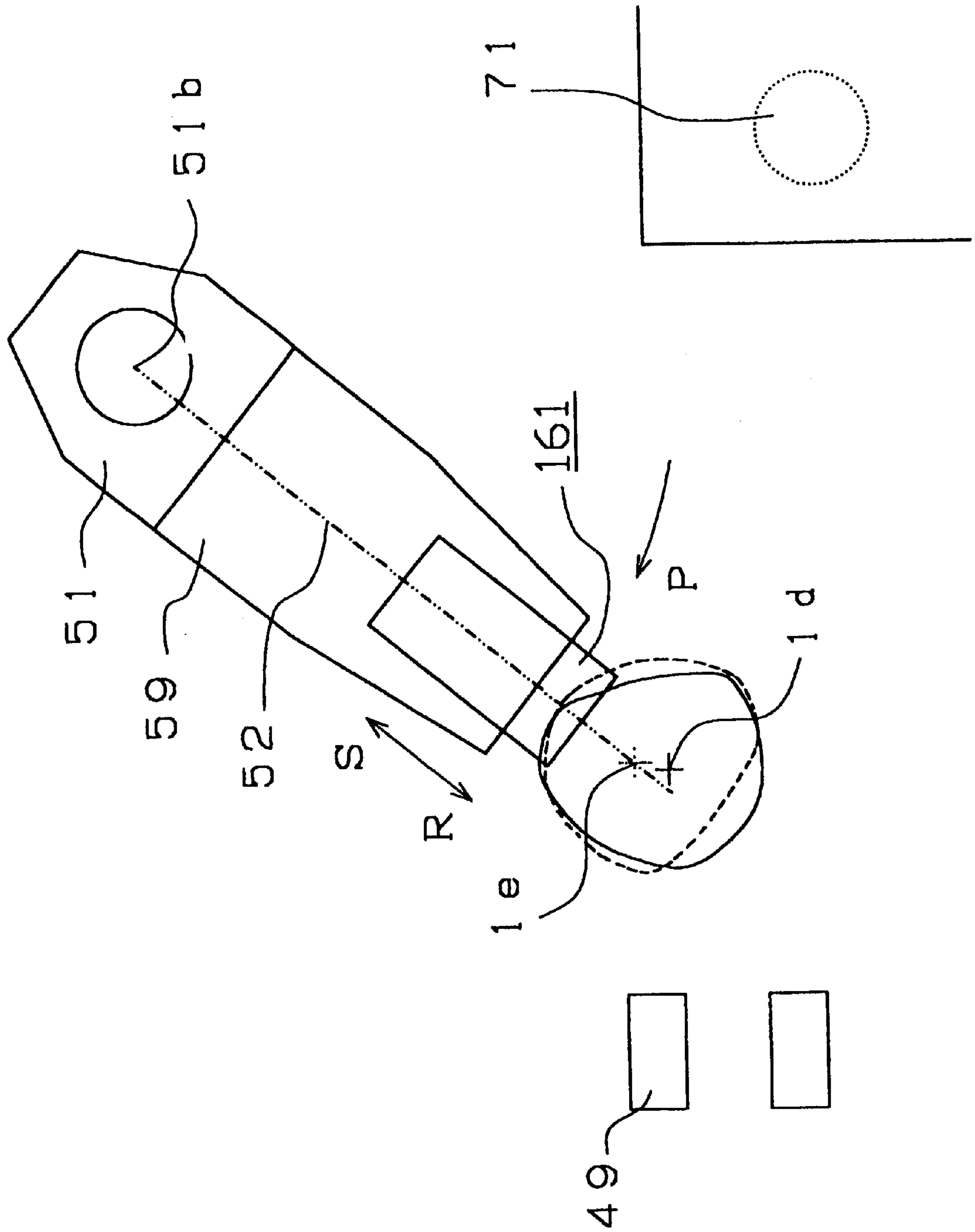

[FIG. 10]
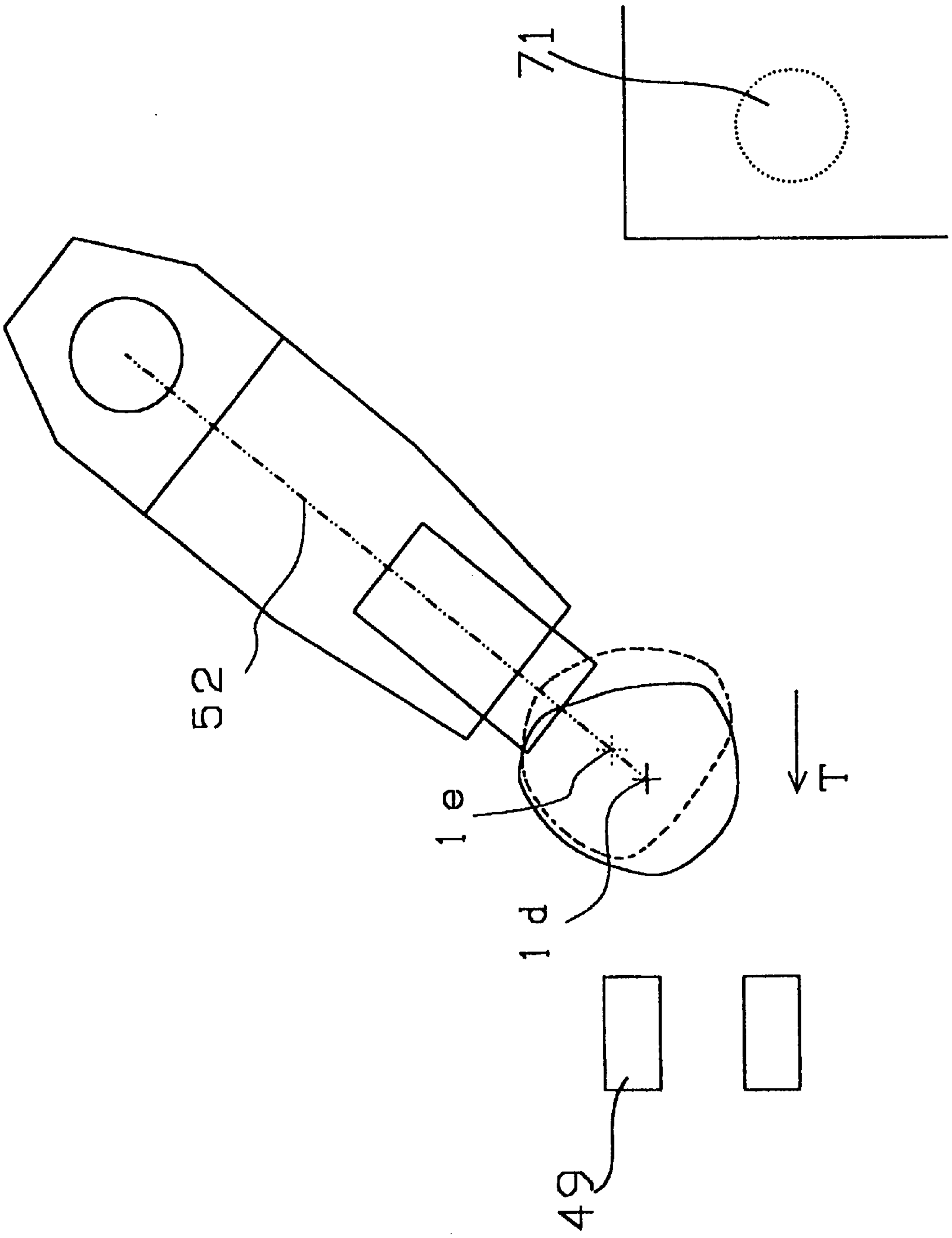

[FIG. 11]
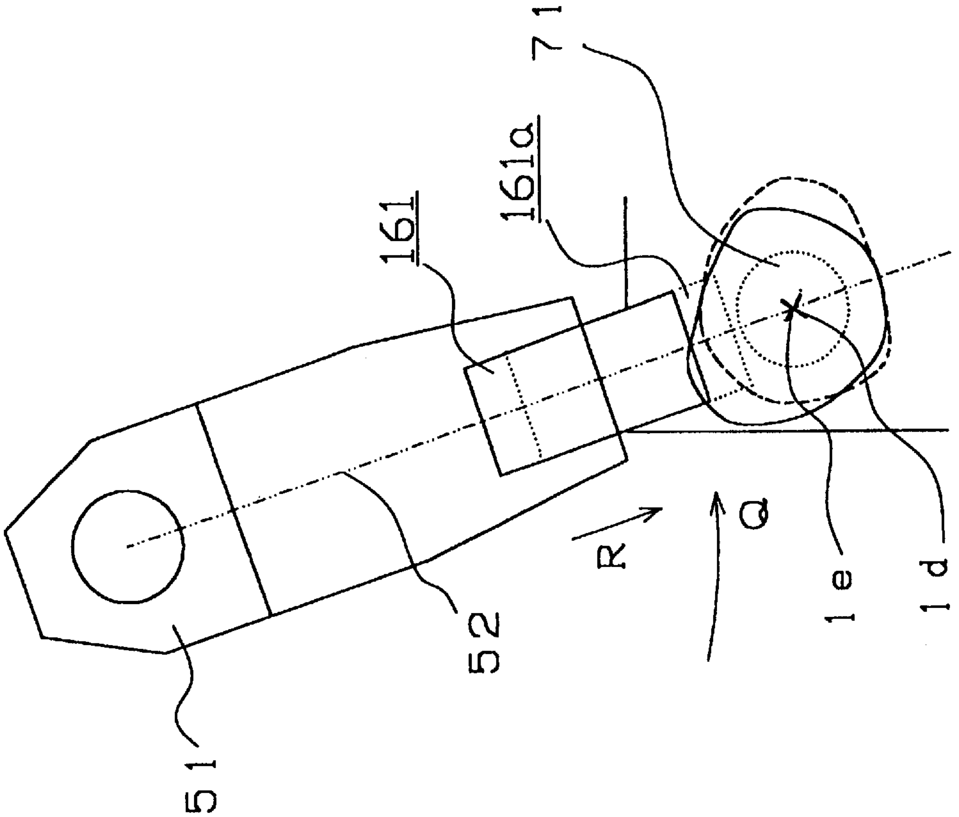

[FIG. 12]
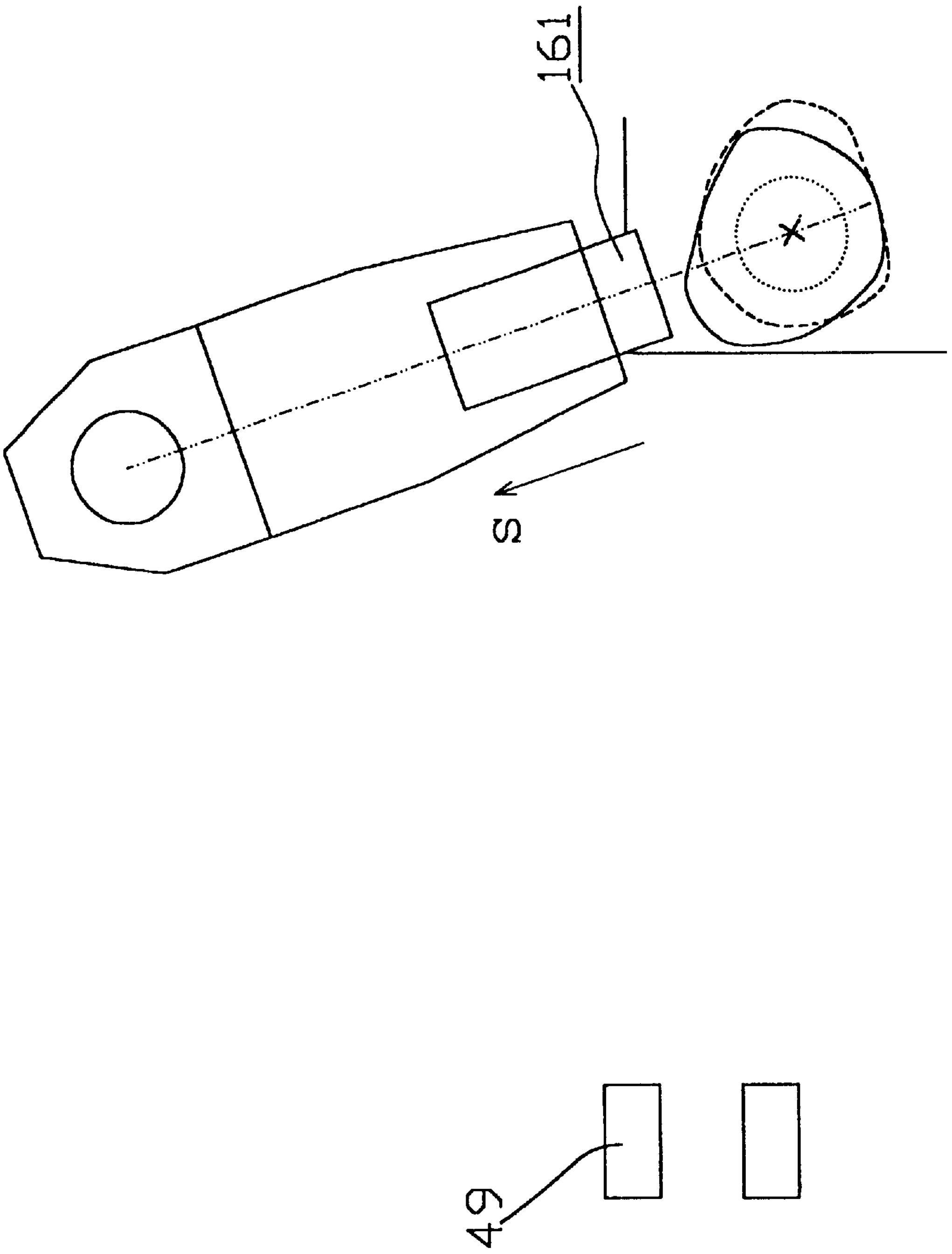

[FIG. 13]
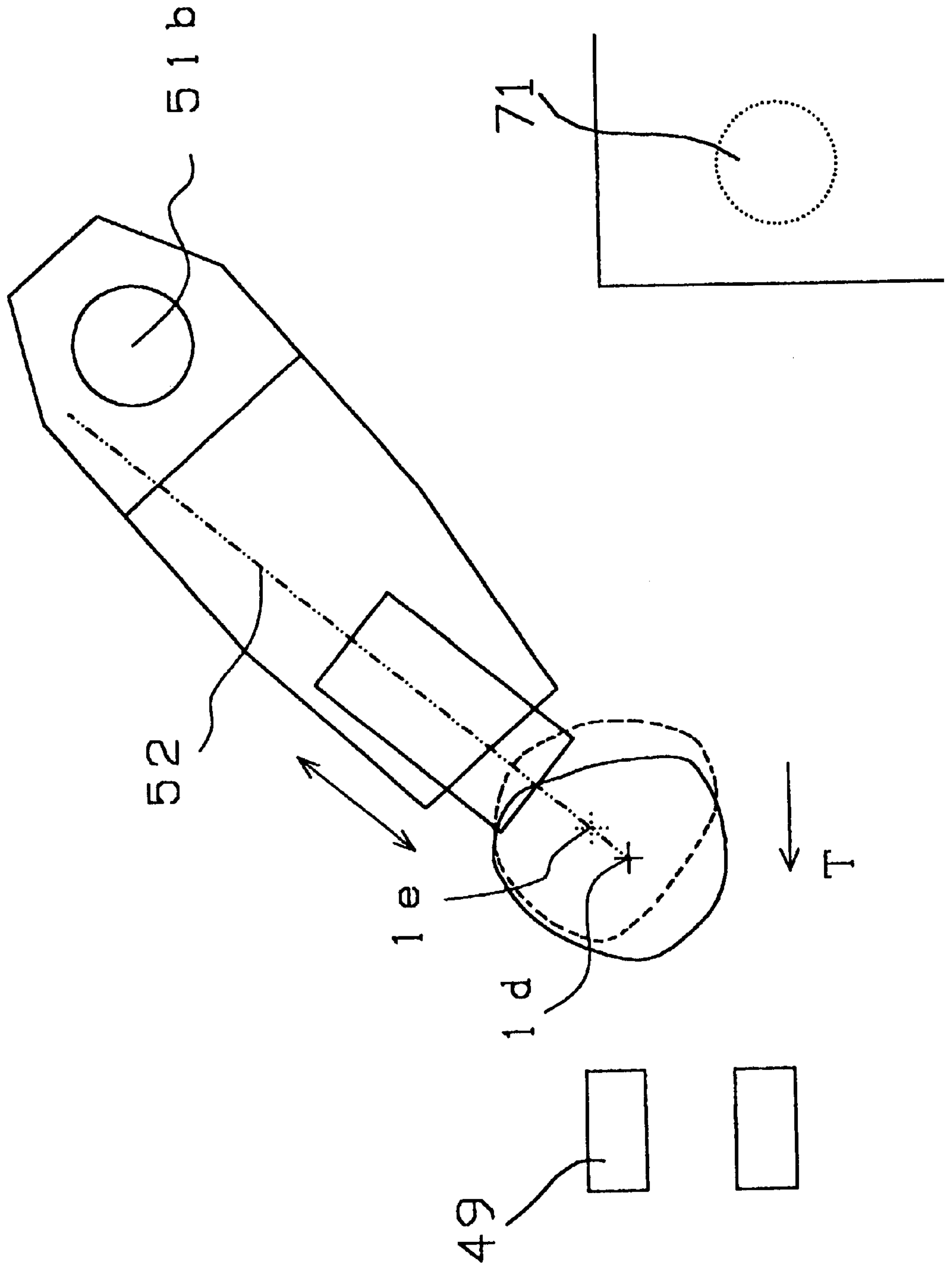

[FIG. 14]
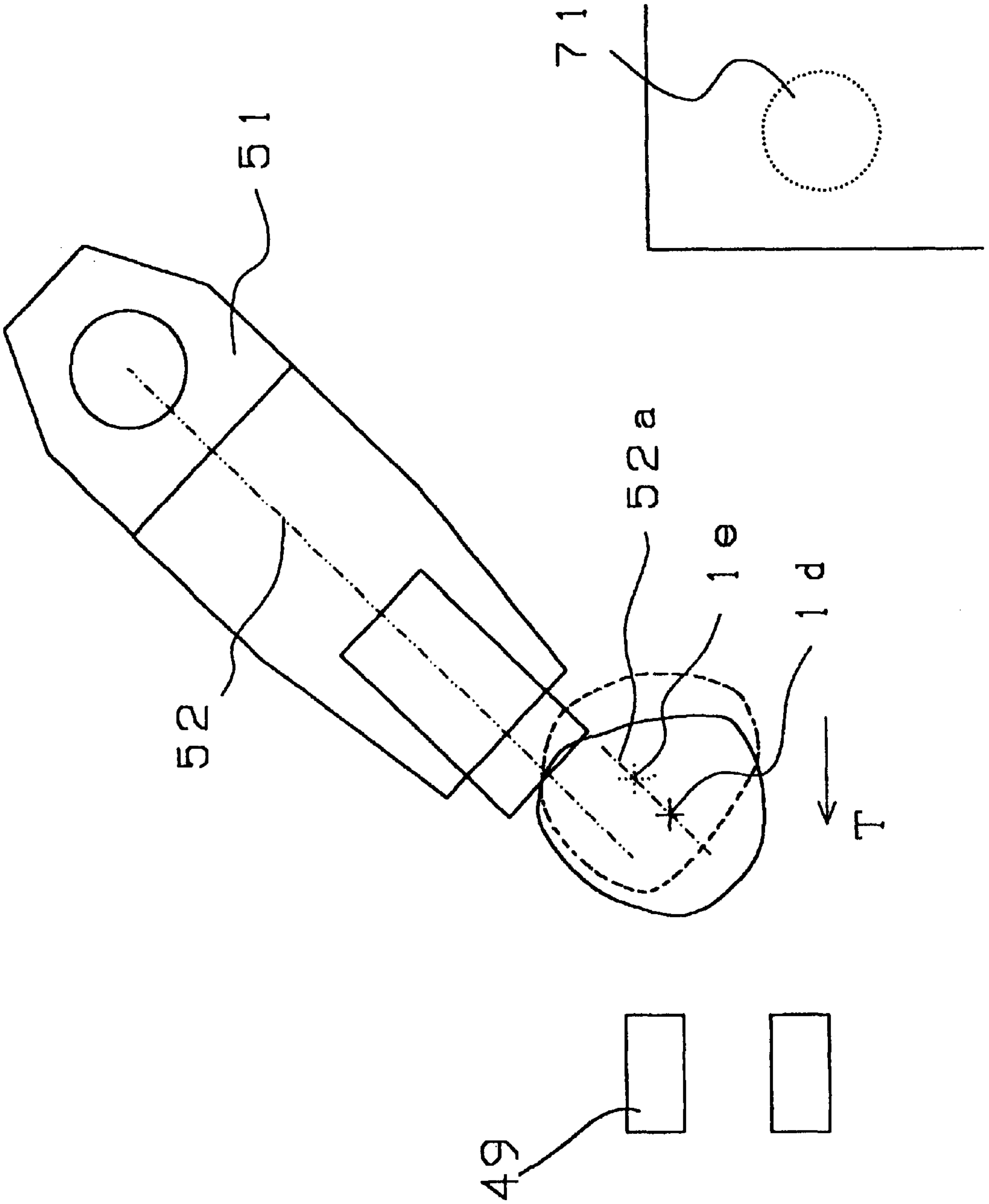

[FIG. 15]
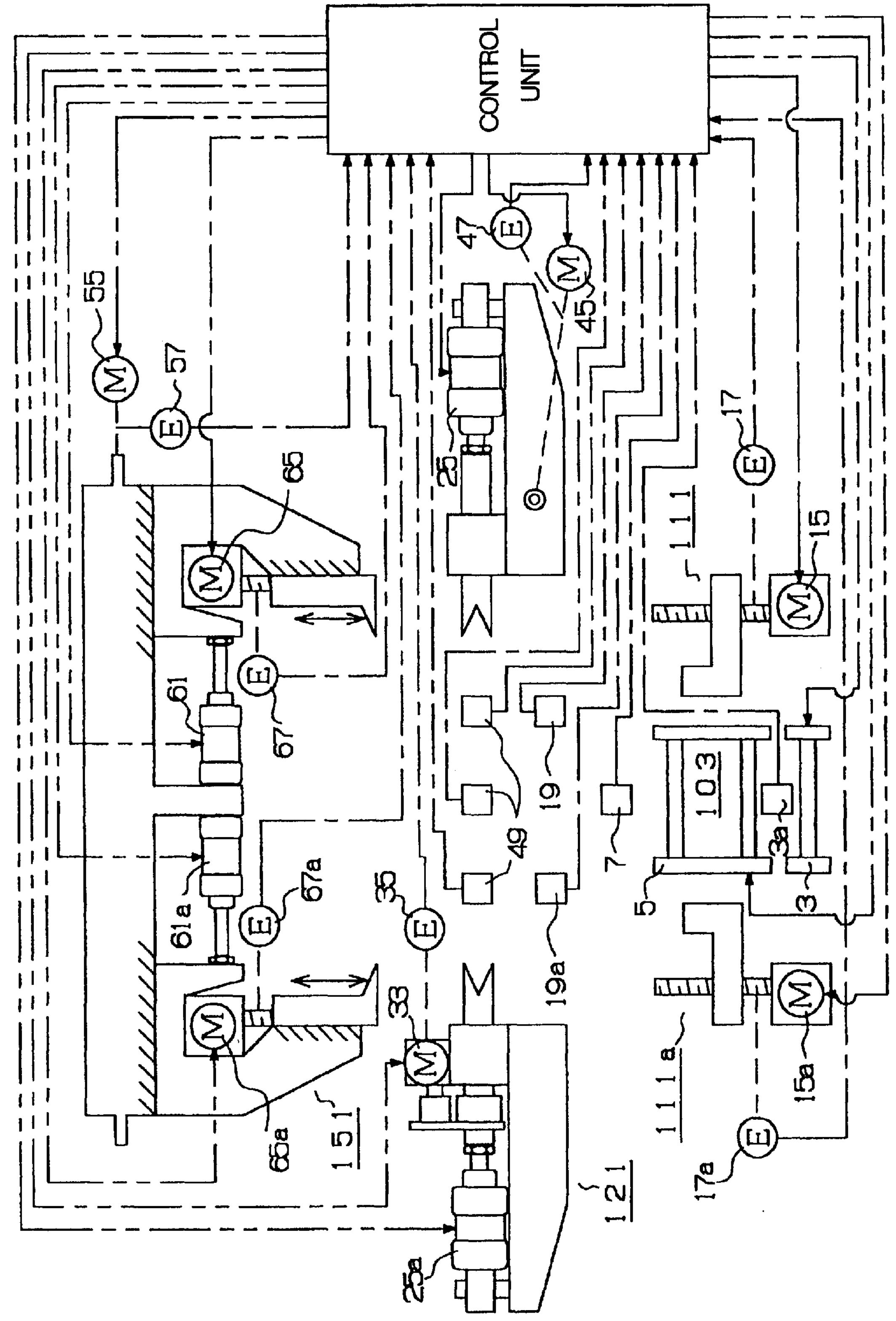

[FIG. 16]
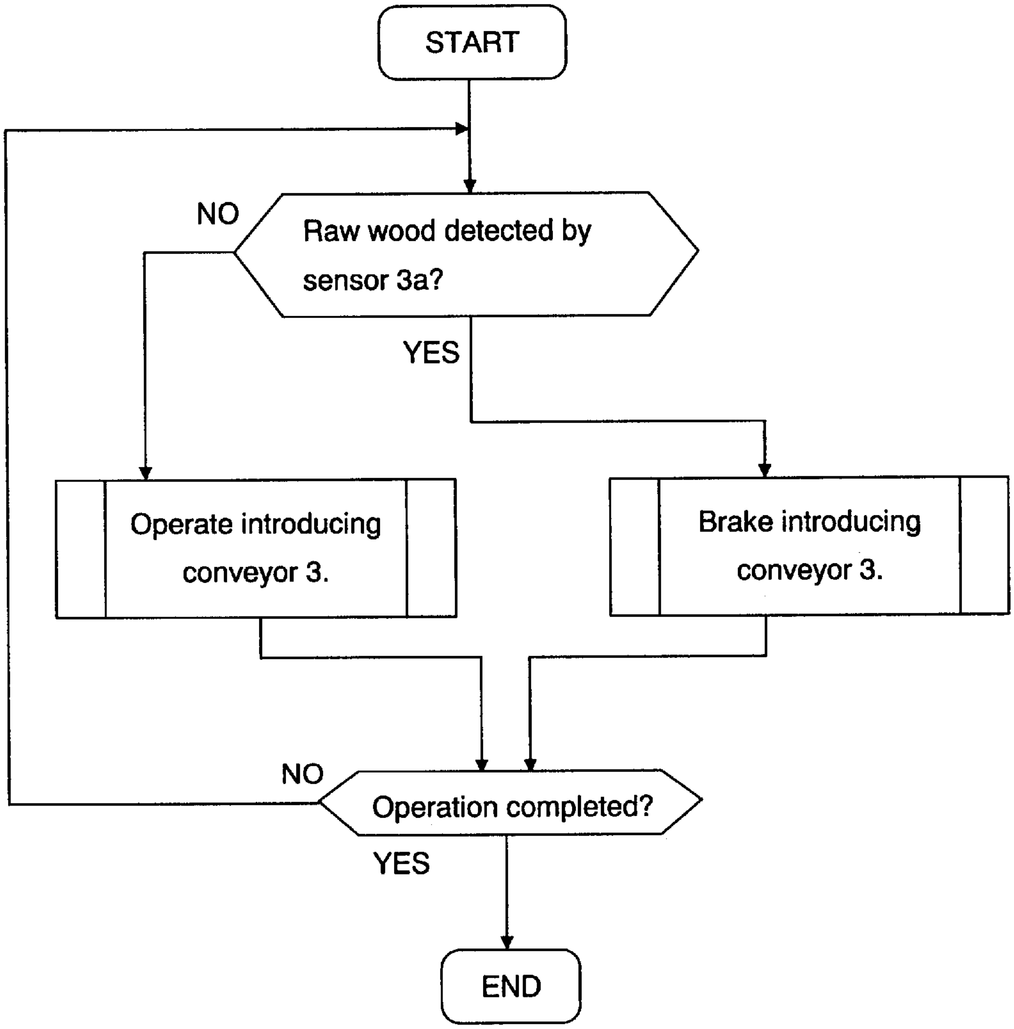

[FIG. 17]
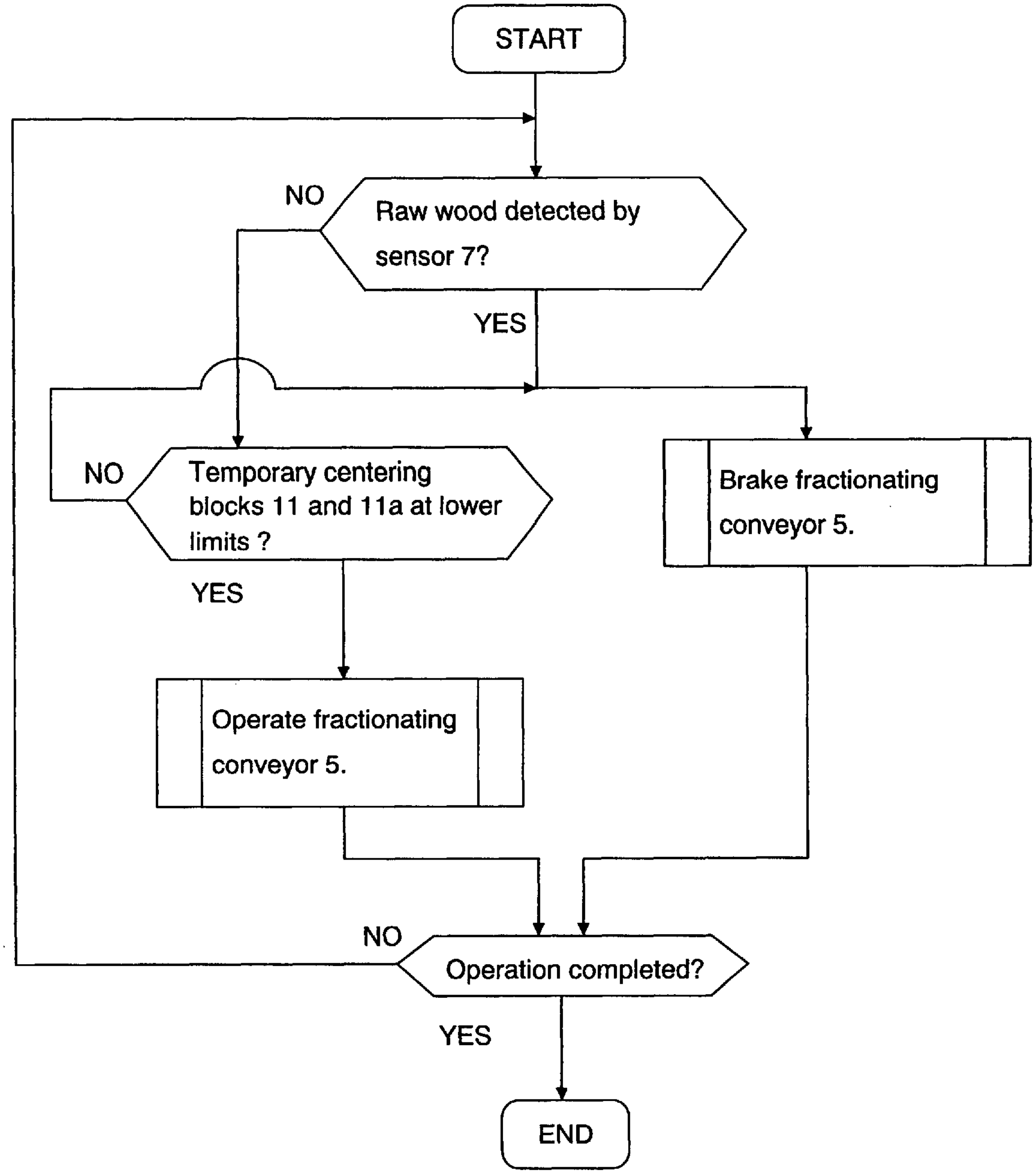

[FIG. 18]
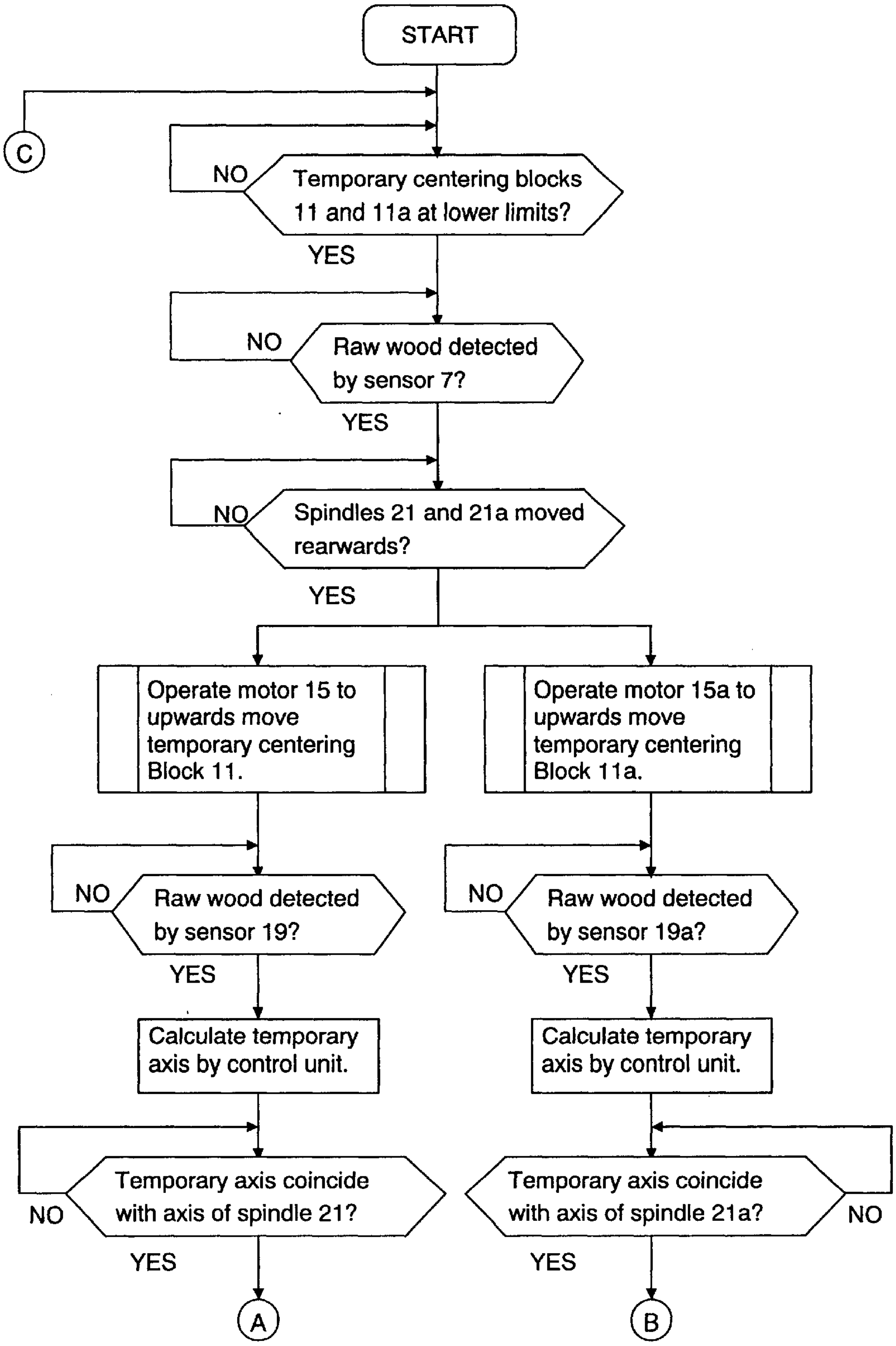

[FIG. 19]
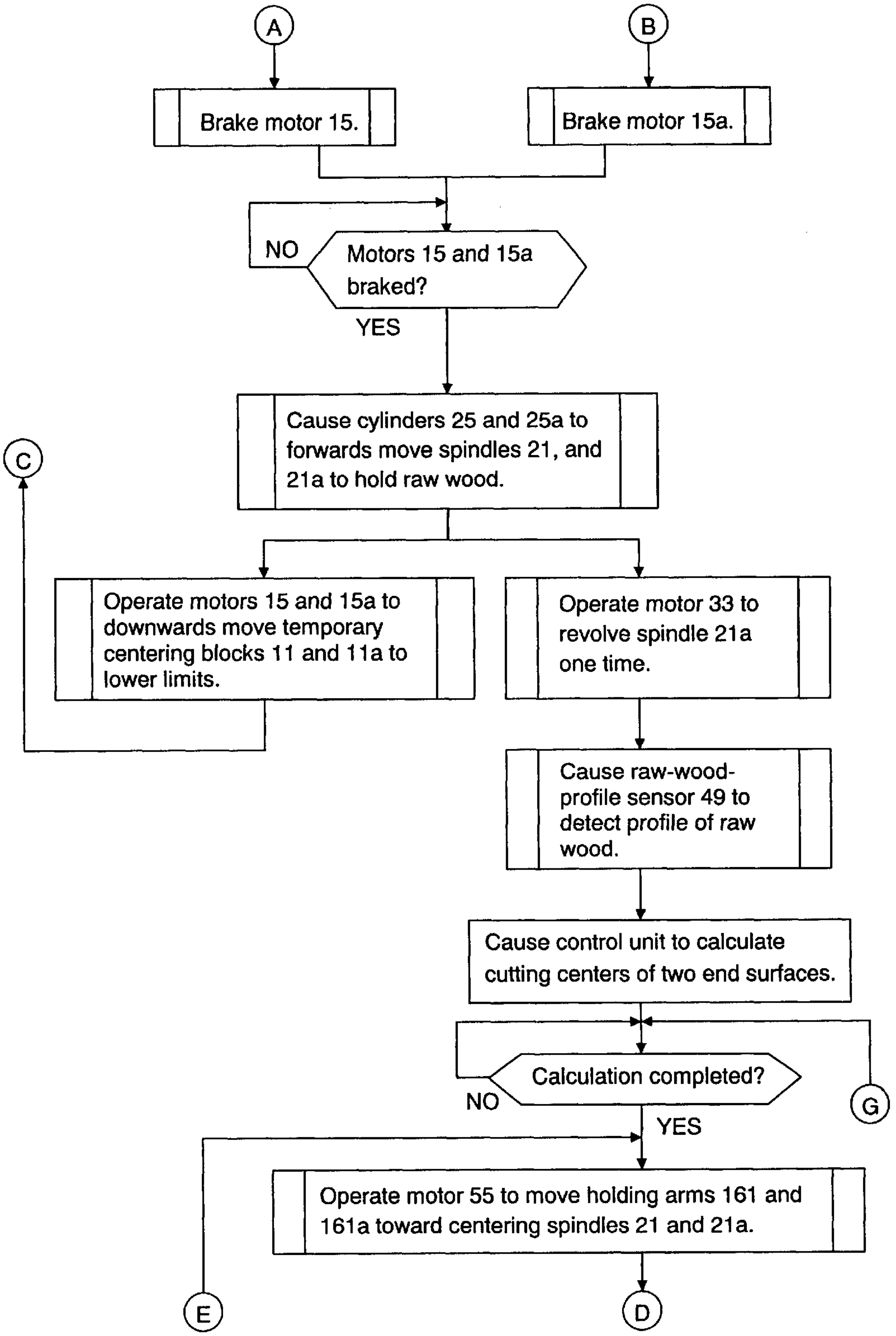

[FIG. 20]
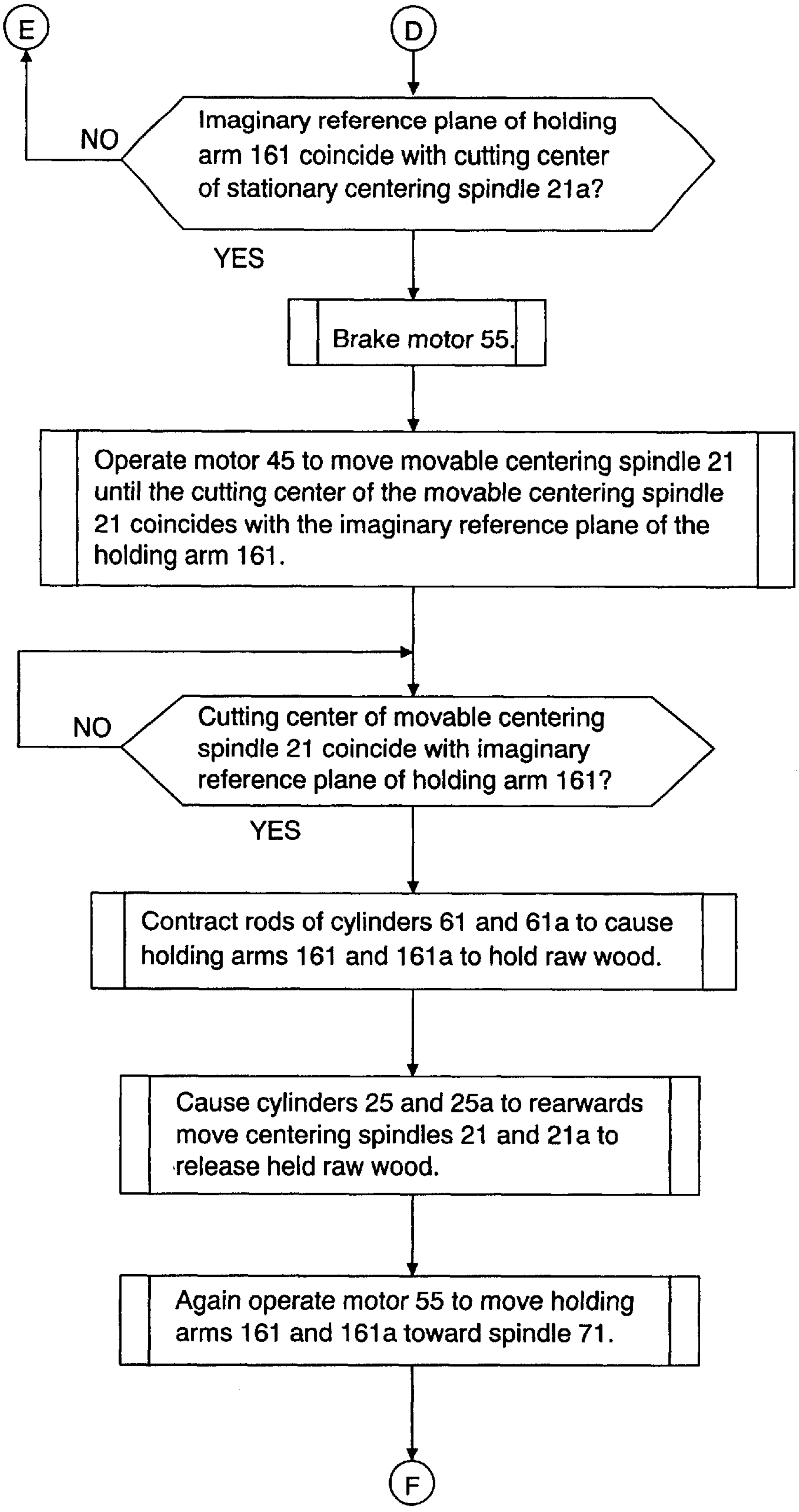

[FIG. 21]
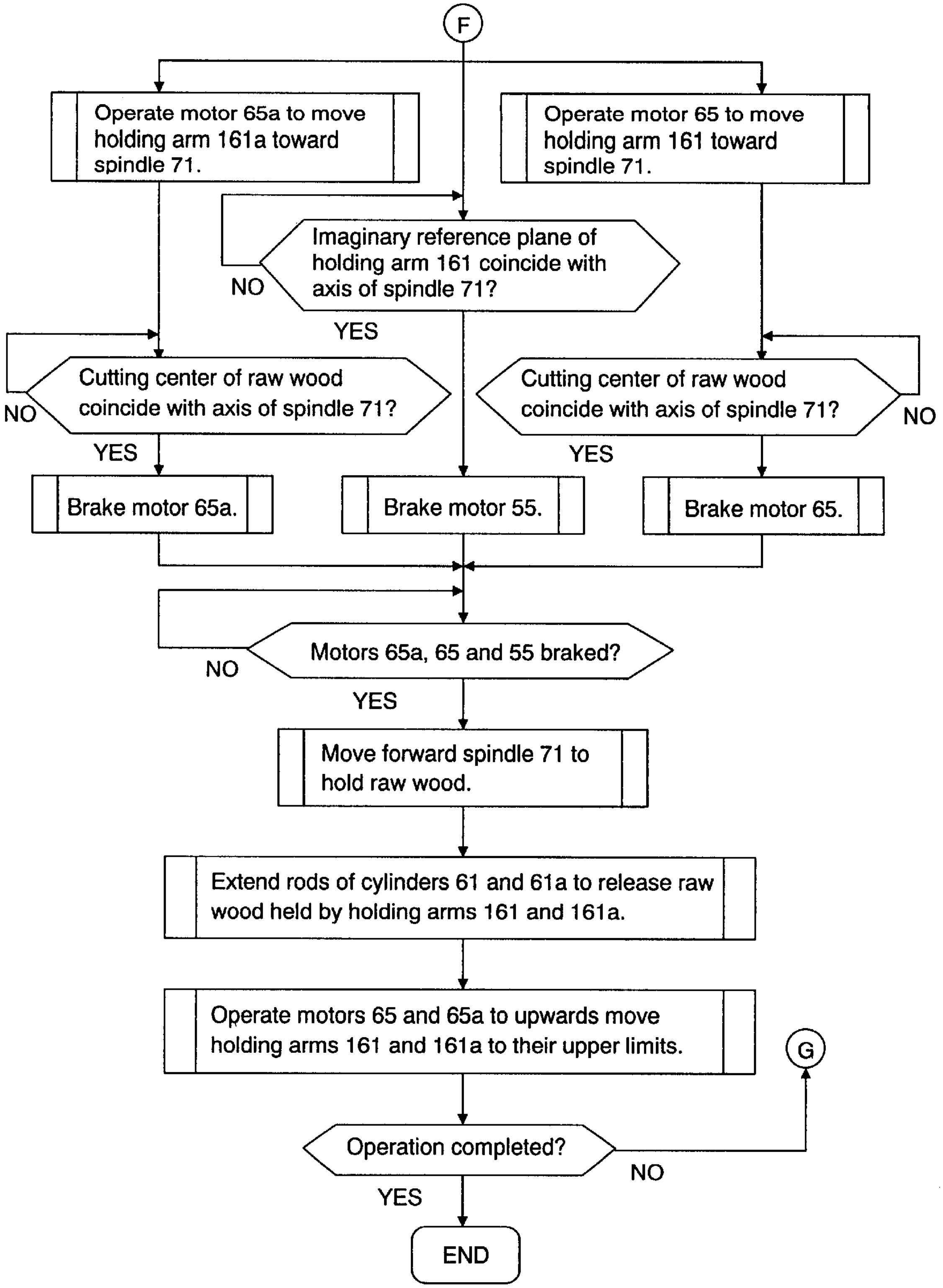

[FIG. 22]
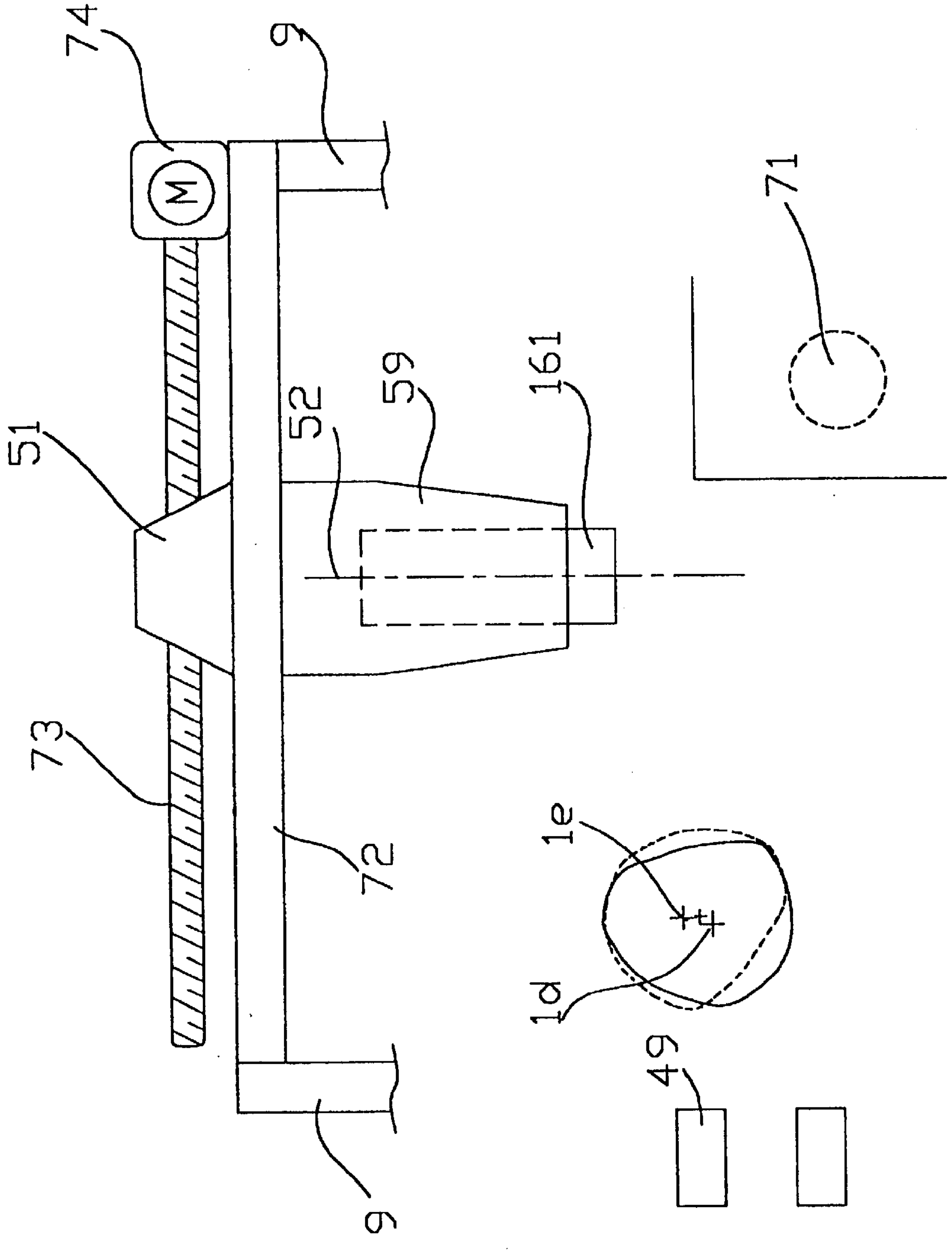

[FIG. 23]
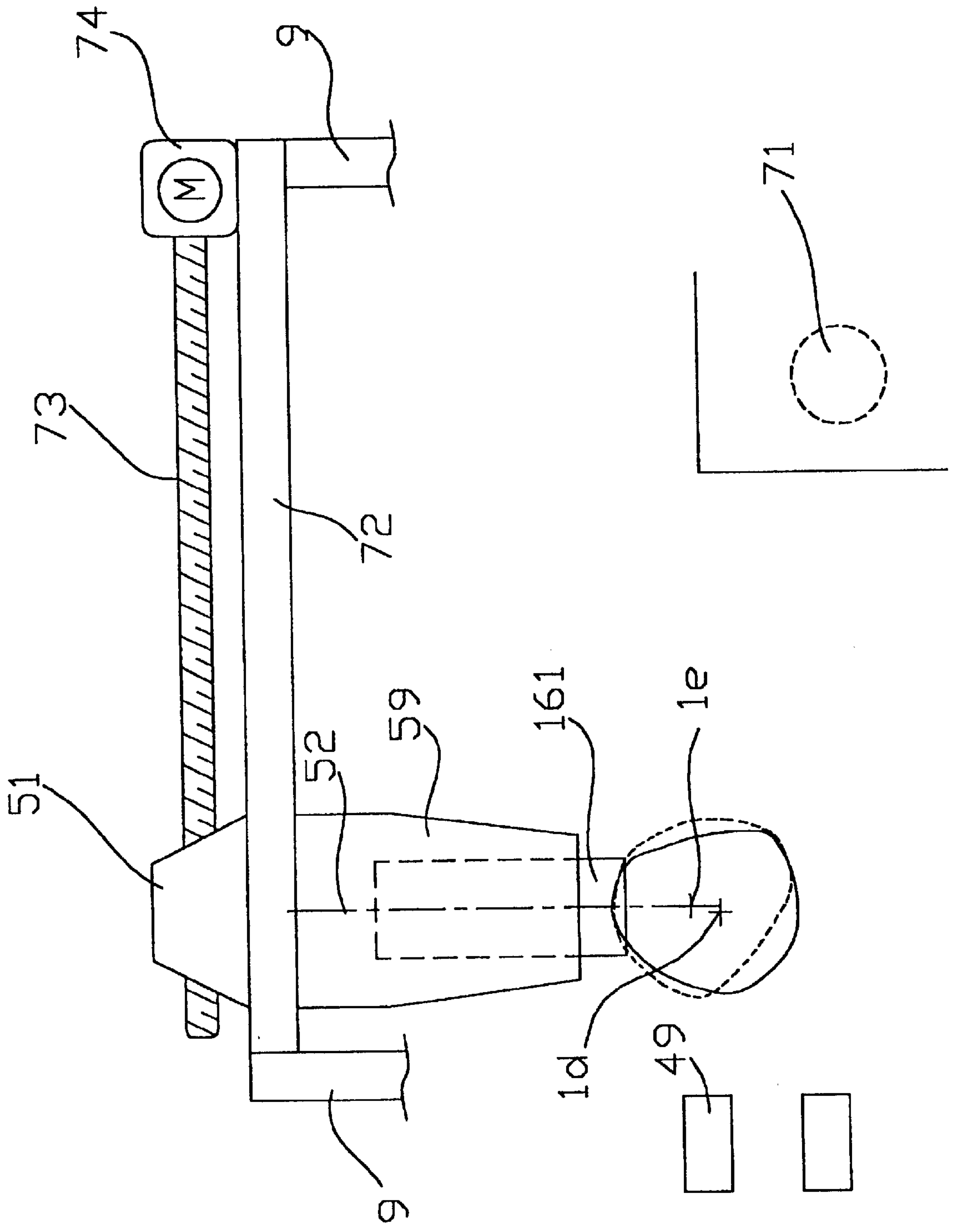

[FIG. 24]
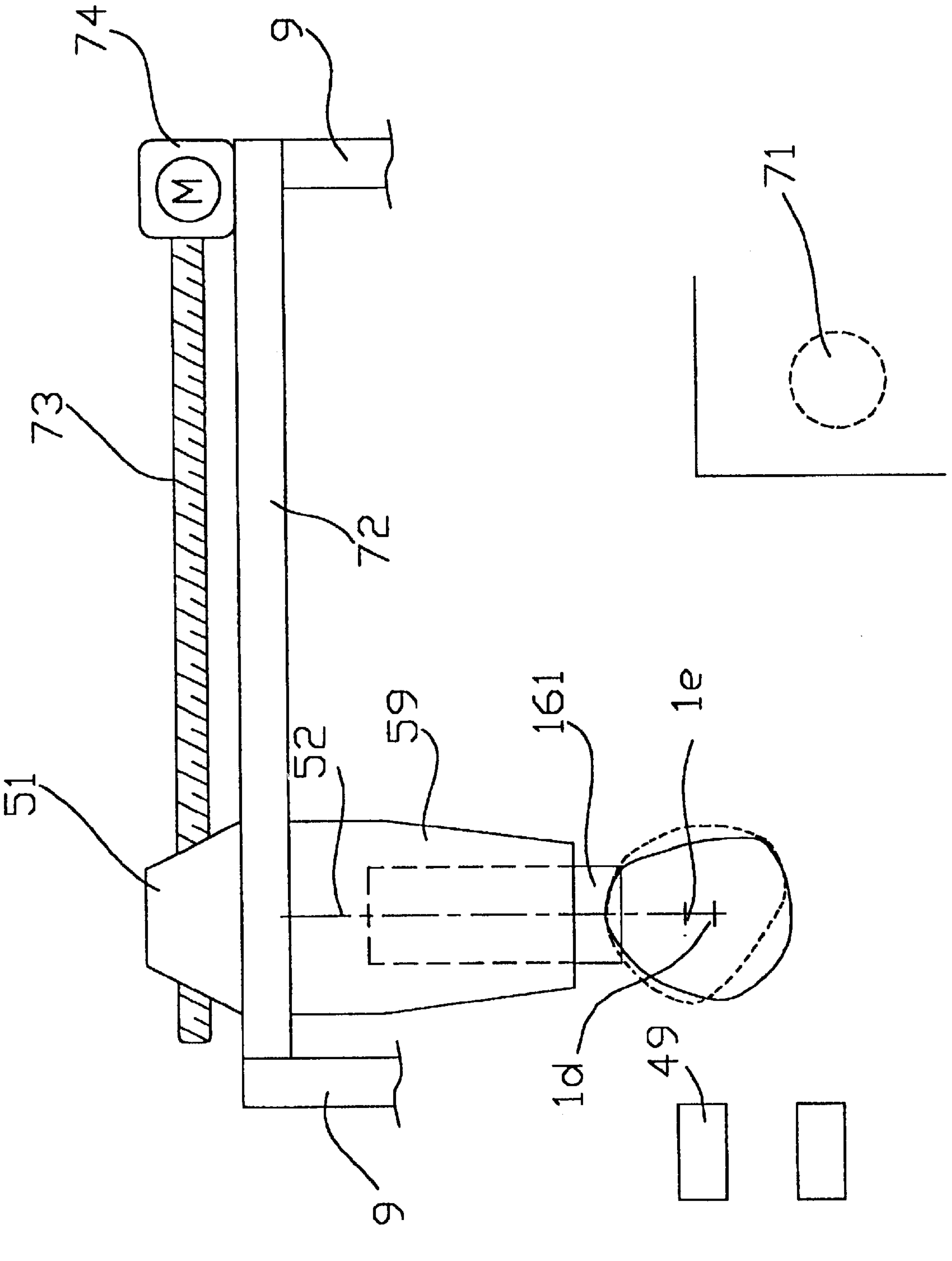

[FIG. 25]
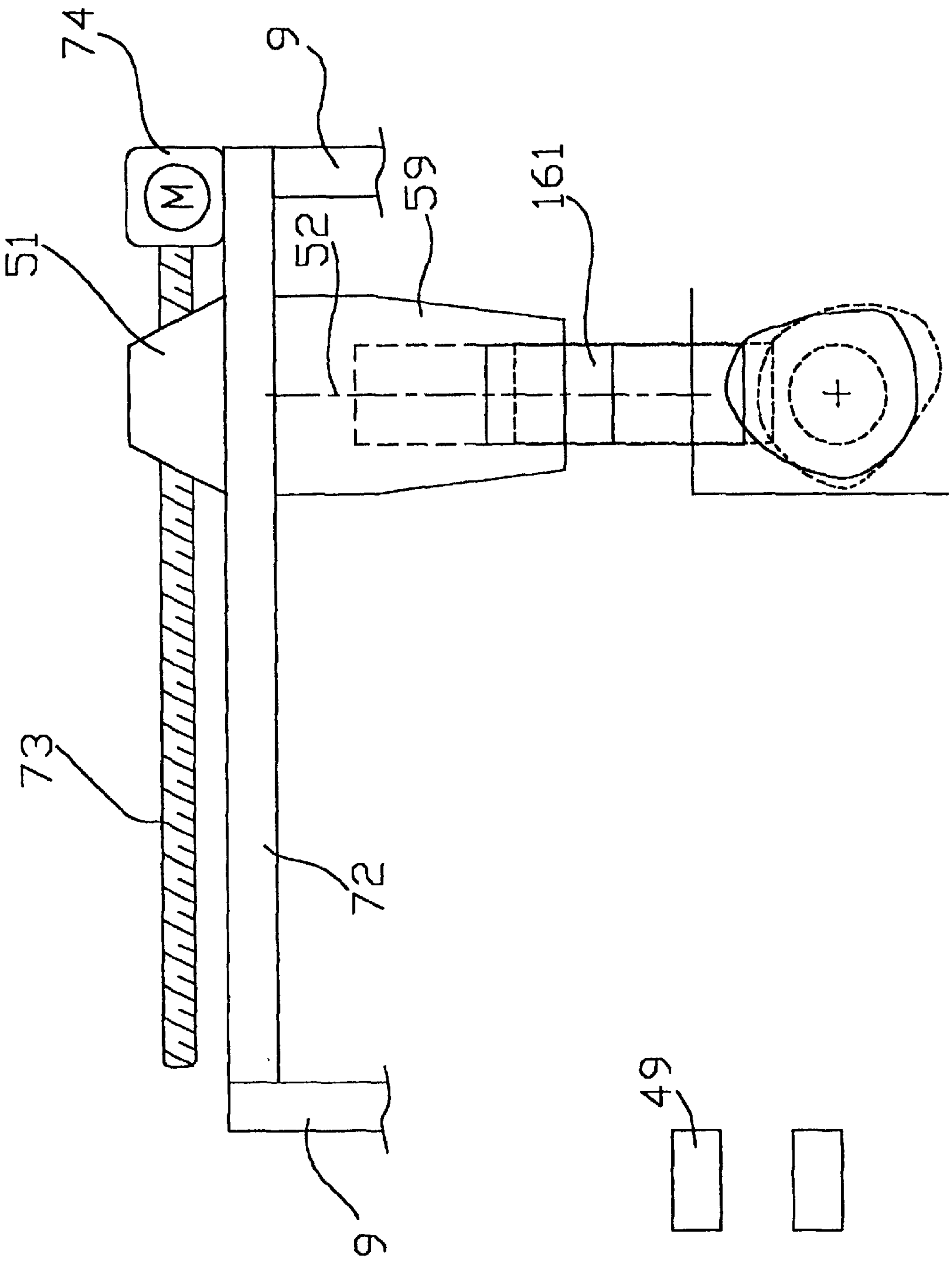

LATHE CHARGER

BACKGROUND OF THE INVENTION

1. Field of the Invention

The present invention relates to an apparatus, that is, a lathe charger, for automatically supplying raw wood to a veneer lathe such that the cutting center of the raw wood is determined so that the cutting center of the raw wood and the axis of a spindle of the veneer lathe coincide with each other.

2. Related Background Art

Hitherto, a method and an apparatus for centering raw wood have been disclosed in Japanese Patent Publication No. 4-60001. The method of centering raw wood comprises the steps of: rotating raw wood about a temporary center by a holding claw disposed at a limit of rearward movement of the raw wood to wait for raw wood; detecting the profiles of cross sections of a plurality of portions in the lengthwise direction of the raw wood so that the coordinates of the axis of the overall body of the raw wood are obtained; forwards moving the holding claw in accordance with the coordinates so that the position of the raw wood in the direction of the X axis is corrected; downwards moving a conveying claw so that the position of the raw wood in the direction of the Y axis is corrected; and changing the claw for holding the raw wood from the holding claw to the conveying claw. The apparatus for centering raw wood comprises: an X-axis correction unit which permits a pair of bearing boxes to move horizontally between frames which are stood erect; spindles each having a holding claw at an end thereof and a rotational-angle sensor and slidably inserted into the pair of the bearing boxes; a mobile unit made to be movable such that the mobile unit is guided by a horizontal beam; conveying claws permitted to be moved upwards/downwards by a Y-axis correction unit and suspended from two sides of the mobile unit: and a displacement-amount sensor provided for the base end of each of a plurality of swingable arms disposed at arbitrary intervals in a lengthwise direction of the raw wood and connected by a pin, wherein an output of an amount of correction of the forward movement of the bearing box is produced to the X-axis correction unit and an output of an amount of correction of the downward movement of the conveying claw is produced to the Y-axis correction unit in accordance with the coordinates of the total axis obtained from data of each of the rotational-angle sensor and the displacement-amount sensor.

The above-mentioned conventional technology, however, suffers from the following problem: the X-axis correction unit must have the structure that both of the pair of the bearing boxes are made to be movable individually in the horizontal direction. Therefore, the manufacturing cost of the apparatus cannot be reduced and the structure becomes too complicated.

SUMMARY OF THE INVENTION

Accordingly, an object of the present invention is to provide a lathe charger which is capable of correcting positions in the directions of X and Y axes with a simple structure and having an automated centering process using a centering spindle and holding and conveying processes using a holding arm.

To achieve the above-mentioned object, according to one aspect of the present invention, there is provided a lathe charger comprising: a pair of centering spindles for holding end surfaces of raw wood; centering means for automatically calculating cutting centers of the two end surfaces of the raw wood held by the pair of the centering spindles; a pair of holding arms for holding the raw wood in place of the pair of the spindles; and means for moving the holding arms in such a manner as to move the pair of holding arms between the centering spindles and spindles of a veneer lathe for an arbitrary distance, wherein the pair of the holding arms can be extended/contracted and one of the pair of the centering spindles is structured to be capable of moving in a direction which intersects a direction in which the pair of the holding arms are extended/contracted, and a control mechanism is provided with which when one of the end surfaces is viewed in parallel with the axis of the centering spindles in a state in which the raw wood having cutting centers of the two end surfaces which have been calculated is held, one of the centering spindles structured to be capable of moving is moved until an imaginary straight line passing through the two coincident cutting centers is made to be in parallel with the direction in which the holding arms are extended/contracted at the position at which the holding arms hold the raw wood, members for holding the raw wood are changed from the centering spindles to the holding arms at the position to which the centering spindle has been moved, and the holding arms are extended/contracted and the holding arms are moved to the spindles of the veneer lathe by the means for moving the holding arms so that the two cutting centers and the axes of the spindles of the veneer lathe are made coincide with each other.

The imaginary straight line passing through the two coincident cutting centers when one of the end surfaces is viewed in parallel with the axis of the centering spindles will now be described. When one of the end surfaces is viewed at an angle in parallel with the axis of the centering spindles, the imaginary straight line is a straight line obtained by connecting a visible cutting center and a hidden and opposite cutting center to each other, the connection being performed on a plane perpendicular to the axis of the centering spindles. The cutting centers are obtained by calculations performed by the mechanism for centering the cutting centers. The above-mentioned definition of the imaginary straight line is applied hereinafter.

Either of the operation for extending/contracting the holding arms or the moving operation performed by the moving means may be performed first or the two operations may be performed simultaneously. Coincidence of the two cutting centers and the axis of the spindles of the veneer lathe with each other is required finally.

The lathe charger according to the present invention may have a structure that the means for moving the holding arms is a rotating mechanism arranged to be rotated about a rotational shaft thereof, and the imaginary straight line passes through the axis of the rotational shaft.

The lathe charger according to the present invention may have a structure that the means for moving the holding arms is a moving mechanism comprising rails for movement, and the imaginary straight line passes through the axis of the holding arms.

According to the present invention, correction of displacements of the cutting centers of the two end surfaces of raw wood automatically calculated by the centering means in two directions on a plane perpendicular to the axis of the spindles of the veneer lathe can be performed. The correction can be performed by moving one of the centering spindles which are holding the raw wood and by performing the extending/contracting operation of the holding arms for holding the raw wood in place of the centering spindles. Therefore, the structure of the apparatus can be simplified, the manufacturing cost can be reduced and satisfactory workability can be obtained.

Other objects, features and advantages of the invention will be evident from the following detailed description of the preferred embodiments described in conjunction with the attached drawings.

BRIEF DESCRIPTION OF THE DRAWINGS

FIG. 1 is a side view showing the overall structure of a first embodiment of the present invention;

FIG. 2 is a partial view of FIG. 1 when viewed from an arrow E;

FIG. 3 is a partial view of FIG. 1 when viewed from an arrow F;

FIG. 4 is a partial view of FIG. 1 when viewed from an arrow G;

FIGS. 5 to 12 are diagrams showing the operation of the first embodiment;

FIG. 13 is a diagram showing the operation of another embodiment;

FIG. 14 is a diagram showing the operation of another embodiment;

FIG. 15 is a diagram of a structure for controlling the operation of the first embodiment;

FIGS. 16 to 21 show flow charts according to the first embodiment; and

FIGS. 22 to 25 are diagrams showing the operation of another embodiment.

DESCRIPTION OF THE PREFERRED EMBODIMENTS

An embodiment of the present invention will now be described with reference to FIGS. 1 to 4 and FIG. 15. The operation of the embodiments will now be described with reference to FIGS. 5 to 12 and FIGS. 16 to 21.

FIG. 1 is a side view showing the overall structure of a veneer lathe incorporating a lathe charger according to the present invention. FIG. 2 is a partial view of FIG. 1 when viewed from an arrow E. FIG. 3 is a partial view of FIG. 1 when viewed from an arrow F. FIG. 4 is a partial view of FIG. 1 when viewed from an arrow G. FIG. 15 is a diagram of a structure for controlling the operation of this embodiment. FIGS. 5 to 12 are diagrams showing the operation of this embodiment. FIGS. 16 to 21 are flow charts.

The lathe charger according to this embodiment incorporates an introducing mechanism 103 for introducing raw wood, a temporary centering mechanism 111 for detecting a temporary center of two edges of the raw wood, a cutting-center centering mechanism 121 for detecting the cutting center in the two end surfaces of the raw wood and conveying mechanism 151 for conveying the raw wood, the cutting center of which has been detected, from the cutting-center centering mechanism 121 to a veneer lathe body 171.

As shown in FIG. 1, the introducing mechanism 103 incorporates an introducing conveyor 3 capable of sequentially introducing the raw wood 1 and formed such that the introducing conveyor 3 is able to rotate and the rotation of the same can be braked. Moreover, the introducing mechanism 103 incorporates a sensor 3*a* for detecting the raw wood 1, a fractionating conveyor 5 capable of sequentially fractionating the sequentially introduced raw wood 1 and formed such that the fractionating conveyor 5 is able to rotate and the rotation of the same can be braked. Moreover, the introducing mechanism 103 incorporates a sensor 7 for detecting the raw wood 1.

As shown in FIG. 2, the temporary centering mechanism 111 incorporates a pair of right and left temporary centering blocks 11 and 11*a* joined to be capable of moving upwards/downwards along inner slide surfaces 91 and 91*a* of a pair of right and left frames 9 and 9*a*, each of the temporary centering blocks 11 and 11*a* being formed into a V-shape. Moreover, the temporary centering mechanism 111 incorporates feed screws 13 and 13*a* for the temporary centering blocks 11 and 11*a*, the feed screws 13 and 13*a* being ball screws or the like. The temporary centering mechanism 111 further incorporates motors 15 and 15*a* for the feed screws 13 and 13*a* for the temporary centering blocks 11 and 11*a*, the motors 15 and 15*a* for the feed screws 13 and 13*a* for the temporary centering blocks 11 and 11*a* being servo motors or the like. The temporary centering mechanism 111 further incorporates displacement sensors 17 and 17*a* for the temporary centering blocks 11 and 11*a*, the displacement sensors 17 and 17*a* for the temporary centering blocks 11 and 11*a* being rotary encoders or the like. The temporary centering mechanism 111 further incorporates sensors 19 and 19*a* for detecting the raw wood 1 which is moved upwards by the temporary centering blocks 11 and 11*a*.

The lower ends of the feed screws 13 and 13*a* are connected to axes of the motors 15 and 15*a* for the feed screws 13 and 13*a* for the temporary centering blocks 11 and 11*a*. The thread portions of the feed screws 13 and 13*a* are received by the temporary centering blocks 11 and 11*a*. The motors 15 and 15*a* for the feed screws 13 and 13*a* for the temporary centering blocks 11 and 11*a* are joined to the frames 9 and 9*a*.

As shown in FIG. 3, the cutting-center centering mechanism 121 is mainly composed of a movable centering spindle 21 and a stationary centering spindle 21*a* which is not moved. Each of the spindles 21 and 21*a* has a claw which is engaged to the edge of the raw wood 1.

The movable centering spindle 21 is able to rotate and move in the axial direction thereof by dint of a bearing 23 joined to a movable mount frame 39. Moreover, the movable centering spindle 21 is able to move in the axial direction thereof by dint of a cylinder 25 joined to the movable mount frame 39. The movable mount frame 39 is mounted on rails 41 arranged in a direction indicated by arrows T-U which is an example of a direction which intersects an extending/contracting direction of a holding arm 161 to be described later. The movable mount frame 39 is reciprocated in a direction perpendicular to the direction of the axis of the movable centering spindle 21 by an operation mechanism. The operation mechanism incorporates a feed screw 43 for the movable mount frame 39, the feed screw 43 being a ball screw or the like. Moreover, the operation mechanism incorporates a motor 45 for the feed screw 43 for the movable mount frame 39, the motor 45 being a servo motor or the like. In addition, the operation mechanism incorporates a sensor 47 for the movable mount frame 39, the sensor 47 being a rotary encoder or the like. A portion of the feed screw 43 for the movable mount frame 39 is connected to a shaft of the motor 45 for the feed screw 43 for the movable mount frame 39, while another portion is screwed in the movable mount frame 39. The motor 45 for the feed screw 43 for the movable mount frame 39 is secured to the frame 9 through a motor mounting frame 45*a*. The rails 41 penetrate the movable mount frame 39 so that the movable mount frame 39 is able to move along the rails 41.

The rotative stationary centering spindle 21*a* is able to move in the axial direction thereof by a bearing 23*a* joined to a stationary mount frame 37. Moreover, the stationary centering spindle 21*a* is able to move in the axial direction thereof by a cylinder 25*a* joined to the stationary mount frame 37. Moreover, the stationary centering spindle 21*a* is also connected to a motor 33 which is capable of revolving the centering spindle 21 and which is a servo motor or the like, the stationary centering spindle 21*a* being connected through a sprocket 31, a chain 29 and a sprocket 27. Thus, when the motor 33 is revolved, the stationary centering spindle 21*a* is revolved. Reference numeral 35 represents a rotational-angle sensor 35 for the centering spindle 21, the rotational-angle sensor 35 being a rotary encoder or the like. The stationary mount frame 37 is joined to the frame 9, while the motor 33 for revolving the centering spindle 21 is connected to the frame 9 through a motor mount frame 33*a*.

The stationary centering spindle 21*a* is able to move in an axial direction with respect to the sprocket 31 and revolve together with the sprocket 31.

Reference numeral 49 represents a raw-wood-profile sensor arranged to project a propagation medium, such as laser beams, electromagnetic waves or ultrasonic waves, to the outer surface of the raw wood 1 to use reflection of the propagation medium so as to detect the distance to the outer surface of the raw wood 1. The raw-wood-profile sensor 49 is joined to the frame 9.

As shown in FIG. 4, the conveying mechanism 151 incorporates a rotative support member 51, brackets 59 and 59*a* arranged to move along slide surfaces 51*a* formed on the lower surface of the support member 51 and holding arms 161 and 161*a* arranged to extend/contract along slide surfaces 591 and 591*a* formed on the inside portion of the brackets 59 and 59*a*. The above-mentioned support member 51 is rotatably supported by bearings 53 and 53*a*. A motor 55 for the support member 51 which is a servo motor or the like controls the reciprocating movement, while a rotational-angle sensor 57 for the support member 51 which is a rotary encoder or the like controls the rotational position. The brackets 59 and 59*a* are, by cylinders 61 and 61*a* joined to the support member 51, reciprocated in a direction in which the raw wood 1 is held between the brackets 59 and 59*a* through holding arms 161 and 161*a* joined to the slide surfaces 591 and 591*a*. The holding arms 161 and 161*a* are extended/contracted in a direction indicated by an arrows R-S by feed screws 63 and 63*a* for the holding arms 161 and 161*a* and motors 65 and 65*a* for the feed screws 63 and 63*a* for the holding arms 161 and 161*a*. The feed screws 63 and 63*a* are ball screws or the like arranged to be engaged to the holding arms 161 and 161*a*. The motors 65 and 65*a* are servo motors or the like joined to the brackets 59 and 59*a*. The leading ends of the holding arms 161 and 161*a* are formed into claw shapes so as to be inserted into the end surface of the raw wood 1. Reference numeral 67 and 67*a* represent sensors 67 and 67*a* for detecting displacements of the holding arms 161 and 161*a*, the sensors 67 and 67*a* being rotary encoders or the like.

FIG. 15 shows a structure for controlling the operations of the introducing mechanism 103, the temporary centering mechanism 111, the cutting-center centering mechanism 121 and the conveying mechanism 151. A control unit is provided which causes the introducing conveyor 3, the fractionating conveyor 5 and motors 15 and 15*a* for the feed screws 13 and 13*a* for the temporary centering blocks 11 and 11*a* to automatically be operated in response to signals obtained from the sensor 3*a* and the displacement sensors 17 and 17*a* for the temporary centering blocks 11 and 11*a*. In response to signals obtained from the sensors 7, 19 and 19*a*, the rotational-angle sensor 35 for the centering spindle 21, the sensor 47 for the movable mount frame 39 and the raw-wood-profile sensor 49, the motor 33 for revolving the centering spindle 21, the motor 45 for the feed screw 43 for the movable mount frame 39 and cylinders 25 and 25*a* are automatically operated. In response to signals obtained from the rotational-angle sensor 57 for the support member 51 and the sensors 67 and 67*a* for detecting displacements of the holding arms 161 and 161*a*, the cylinders 61 and 61*a*, the motor 55 for the support member 51 and motors 65 and 65*a* for the feed screws 63 and 63*a* for the holding arms 161 and 161*a* are automatically operated.

The operation of this embodiment having the above-mentioned structure will now be described with reference to FIGS. 5 to 12 showing the operations and flow charts shown in FIGS. 16 to 21.

Referring to FIG. 1, when the raw wood 1 on the fractionating conveyor 5 is detected by the sensor 3*a*, a detection signal is supplied to the control unit. In response to an output signal from the control unit, the introducing conveyor 3 is braked (see FIG. 16).

When the raw wood 1 sequentially introduced by the claw 5*a* of the fractionating conveyor 5 is detected by the sensor 7, a detection signal is supplied to the control unit. In response to an output signal supplied from the control unit, the fractionating conveyor 5 is braked (see FIG. 17).

Simultaneously with the operation for braking the fractionating conveyor 5, the temporary centering mechanisms 111 are operated. Although right and left temporary centering mechanisms 111 shown in FIG. 2 are individually operated, the operations are the same. Therefore, the operation of only the right-hand temporary centering mechanism 111 shown in FIG. 2 will now be described and that of the left-hand temporary centering mechanism is omitted from description.

Simultaneously with the operation for braking the fractionating conveyor 5, the motor 15 for the feed screw 13 for the temporary centering block 11 is operated in response to an output signal from the control unit. Thus, the temporary centering block 11 is moved upwards so that the raw wood 1 is moved upwards. Simultaneously, a signal is transmitted, to the control unit, from the displacement sensor 17 of the temporary centering block 11.

In FIG. 5, distance L1 from a position at which the sensor 19 detects the upper portion of the raw wood 1 to the axis of the movable centering spindle 21, distance L2 from the position at which the sensor 19 detects the upper portion of the raw wood 1 to the lower limit of the temporary centering block 11, the shape and dimensions of the raw wood 1 are previously communicated to the control unit.

When the sensor 19 detects the raw wood 1 which is being moved upwards, a detection signal is supplied to the control unit. Since distance L3 for which the raw wood 1 has been moved upwards at the foregoing time has been communicated to the control unit by the signal transmitted from the displacement sensor 17, the control unit obtains the diameter of the raw wood 1 in response to the signal supplied from the sensor 19, the distances L2 and L3 and the shape and dimensions of the temporary centering block 11. Thus, the control unit obtains the temporary axis of the raw wood 1, and obtains radius L4 of the raw wood 1 (see FIG. 18).

Then, the temporary centering block 11 in the state shown in FIG. 5 is furthermore upwards moved for distance expressed such that L4+L1, and then the motor 15 for the feed screw 13 for the temporary centering block 11 is braked. Thus, the temporary axis of the raw wood 1 is made coincide with the axis of the movable centering spindle 21 (see FIG. 6).

As described above, also the left-hand temporary centering mechanism 111 shown in FIG. 2 is operated similarly so that the motor 15*a* is braked. As a result, the temporary axis of the raw wood 1 is made coincide with the axis of the stationary centering spindle 21*a*.

After the motors 15 and 15*a* have been braked, the cylinders 25 and 25*a* are operated to forwards move the centering spindles 21 and 21*a*. Thus, the raw wood 1 is held by the centering spindles 21 and 21*a*.

Then, the motors 15 and 15*a* are revolved so that the temporary centering blocks 11 and 11*a* are moved downwards to their lower limit positions.

After the downward movement has been completed, the fractionating conveyor 5 is again rotated in response to an output signal from the control unit (see FIG. 17).

Simultaneously, the motor 33 for revolving the centering spindle 21 is revolved so that the held raw wood 1 is revolved one time (see FIG. 7). At this time, a signal is supplied from the rotational-angle sensor 35 for the centering spindle 21 to the control unit whenever the stationary centering spindle 21*a* is revolved by an arbitrary number of revolutions. Simultaneously, in response to each signal, the raw-wood-profile sensor 49 transmits, to the control unit, a signal corresponding to the distance to the outer surface of the raw wood 1. In response to the signals supplied from the rotational-angle sensor 35 for the centering spindle 21 and the raw-wood-profile sensor 49, the control unit obtains the cutting centers of the two end surfaces of the raw wood 1 (that is, between the end surface adjacent to the movable centering spindle 21 and the end surface adjacent to the stationary centering spindle 21*a*).

If the raw wood has a shape, for example, as shown in FIG. 8, the cutting center of the end surface adjacent to the movable centering spindle 21 indicated by a solid line is obtained at position 1*d* indicated by symbol + shown with a solid line. On the other hand, the cutting center of the end surface adjacent to the stationary centering spindle 21*a* indicated by a dashed line is obtained at position 1*e* indicated by symbol + shown with a dashed line. FIG. 8 is a diagram of the ends surface of the raw wood 1 when viewed from the movable centering spindle 21 in parallel with the centers of the spindles 21 and 21*a*. A straight line passing through the two cutting centers 1*d* and 1*e* shown in FIG. 8 is defined to be an "imaginary straight line" according to the present invention.

After the cutting centers 1*d* and 1*e* have been obtained, the motor 55 for the support member 51 is revolved to rotate the support member 51. Thus, the pair of the holding arms 161 and 161*a* are moved toward the spindles 21 and 21*a* in a direction indicated by an arrow P shown in FIG. 9 (see FIG. 19).

Simultaneously, a signal is transmitted from the rotational-angle sensor 57 for the support member 51 to the control unit. When the control unit has confirmed that the axis 52 of the holding arm 161 (161*a*) has been made coincide with the cutting center 1*e* of the end surface of the raw wood 1 adjacent to the stationary centering spindle 21*a*, the control unit revolves the motor 55 for the support member 51.

The position (see FIGS. 9 and 20) is a position at which the raw wood 1 is held.

After the motor 55 for the support member 51 has been braked, the motor 45 for the feed screw 43 for the movable mount frame 39 is revolved so that a state in which the raw wood 1 is held between the spindles 21 and 21*a* is realized. In the foregoing state, the movable centering spindle 21 is moved in a direction indicated by an arrow T shown in FIG. 3. Simultaneously, the sensor 47 for the movable mount frame 39 transmits a signal to the control unit.

The motor 45 for the feed screw 43 for the movable mount frame 39 is revolved until the imaginary straight line passing through the cutting centers 1*d* and 1*e* coincides with the axis 52 of the holding arm 161 (161*a*) as shown in FIG. 10. Thus, the movable centering spindle 21 is moved. When the coincidence of the imaginary straight line with the axis 52 of the holding arm has been confirmed in response to the signal supplied from the sensor 47 for the movable mount frame 39, the motor 45 for the feed screw 43 for the movable mount frame 39 is braked.

Then, the rods of the cylinders 61 and 61*a* are contracted so that the holding arms 161 and 161*a* are moved to approach each other. Thus, the raw wood 1 is held between the holding arms 161 and 161*a*.

Then, the rods of the cylinders 25 and 25*a* are contracted so that the spindles 21 and 21*a* are moved rearwards. Thus, the held raw wood 1 is released. Then, the raw wood 1 held between the spindles 21 and 21*a* is held between the holding arms 161 and 161*a*.

Then, the motor 55 for the support member 51 is again revolved so that the support member 51 is rotated in a direction opposite to the above-mentioned process. Thus, the pair of the holding arms 161 and 161*a* are moved toward the spindles 71 of the veneer lathe, that is, in a direction indicated by an arrow Q shown in FIG. 11. Simultaneously, the rotational-angle sensor 57 for the support member 51 transmits a signal to the control unit.

Then, the motors 65 and 65*a* for the feed screws 63 and 63*a* for the holding arms 161 and 161*a* are revolved so that the holding arms 161 and 161*a* are extended in a direction indicated by an arrow R. Simultaneously, the sensors 67 and 67*a* for detecting displacements of the holding arms 161 and 161*a* transmit signals to the control unit (see FIG. 20).

When the control unit has confirmed that the cutting centers 1*d* and 1*e* of the raw wood 1 have been made coincide with the axes of the spindles 71 in response to the signals supplied from the corresponding sensors 67 and 67*a* for detecting displacements of the holding arms 161 and 161*a*, the motor 55 for the support member 51 and the motors 65 and 65*a* for the feed screws 63 and 63*a* for the holding arms 161 and 161*a* are braked.

Then, the spindles 71 of the veneer lathe are moved forwards so as to hold the raw wood 1 therebetween. Then, the rods of the cylinders 61 and 61*a* are extended so that the raw wood 1 held between the holding arms 161 and 161*a* is released.

Then, the holding arms 161 and 161*a* are contracted in a direction indicated by an arrow S shown in FIG. 12.

The foregoing processes are repeated so that the cutting centers of the raw wood are obtained. Then, the raw wood is supplied in such a manner that the obtained cutting centers coincide with the axes of the spindles.

The above-mentioned embodiment has the structure that the movement of the holding arms 161 and 161*a* in the direction indicated by the arrow Q by dint of the rotation of the support member 51 and the movement in the direction indicated by the arrow R (sometimes in the direction indicated by the arrow S because of contraction) by dint of extension of the holding arms 161 and 161*a* are performed simultaneously. However, either movement may be performed first.

The above-mentioned embodiment has the structure that the axis 52 of the holding arms 161 and 161*a* passes through the rotational axis 51*b* of the support member 51, as shown in FIG. 9. The axis 52 is made not to pass through the rotational axis 51*b* by, in parallel, moving the axis 52 of the holding arms 161 and 161*a* or by inclining the same, as shown in FIG. 13.

The above-mentioned embodiment has the structure that the imaginary straight line and the axis 52 of the holding arms 161 and 161*a* have the relationship that the imaginary straight line and the axis 52 of the holding arms 161 and 161*a* coincide with each other, as shown in FIG. 10. A structure having an imaginary straight line 52*a* moved in parallel may be employed, as show in FIG. 14. In the foregoing case, the motor 55 for the support member 51 is braked in such a manner that the cutting center 1*e* is brought to a position apart from the axis of the holding arm for an arbitrary distance. The foregoing position is made to the position at which the raw wood is held. Then, the motor 45 for the feed screw 43 for the movable mount frame 39 is revolved until the imaginary straight line 52*a* is brought to the position at which the imaginary straight line 52*a* is in parallel to the axis of the holding arm so that the movable centering spindle 21 is moved. Thus, the cutting center 1*d* is moved in a direction indicated by an arrow T. The raw wood 1 is supplied to the veneer lathe in such a manner that the cutting centers 1*d* and 1*e* coincide with the axis of the spindles 71 of the veneer lathe.

The mechanism for operating the movable centering spindle 21 according to the foregoing embodiment has the structure that the movable centering spindle 21 is mounted on the movable mount frame 39. Moreover, the rails 41 are allowed to penetrate the movable mount frame 39. In addition, the movable mount frame 39 is enabled to reciprocate in a direction perpendicular to the axial direction of the movable centering spindle 21 by the feed screw 43 which is adapted to the movable mount frame 39 and which is a ball screw or the like, the motor 45 which is adapted to the feed screw 43 for the movable mount frame 39 and which is a servo motor or the like and the sensor 47 which is adapted to the movable mount frame 39 and which is a rotary encoder or the like. The mechanism for operating the movable centering spindle 21 is not limited to the above-mentioned mechanism. Any mechanism capable of controlling the position may be employed.

The above-mentioned embodiment has the structure that the means of the conveying mechanism 151 for moving the holding arm 161 is the mechanism capable of rotating about the rotational axis 51*b*. The mechanism may be a moving mechanism comprising rails for movement.

FIGS. 22 to 25 are diagrams showing the operations of an embodiment using the rails for movement. Referring to FIG. 22, reference numeral 9 represents a frame, 161 represents a holding arm, 59 represents a bracket, 51 represents a support member, 49 represents a raw-wood-profile sensor and 71 represents a spindles for a veneer lathe. The above-mentioned structure is the same as that of the above-mentioned embodiment. Reference numeral 72 represents rails for movement arranged between frames 9. The support member 51 is able to move while the support member 51 is guided by the rails for the movement. Reference numeral 73 represents a feed screw and 74 represents a motor for the support member 51. The feed screw 73 is able to revolve to the right and left by the motor 74 for the support member 51 so that the support member 51 engaged to the feed screw 73 is moved. Note that the control mechanism for operating the above-mentioned elements has the same structure as that according to the above-mentioned embodiment. Therefore, the control mechanism is omitted from description.

Referring to FIG. 23, when coincidence of the axis 52 of the holding arm 161 with the cutting center 1*e* of the end surface adjacent to the stationary centering spindle has been confirmed, the motor 74 for the support member 51 is braked. Moreover, the movable centering spindle is moved to move the movable centering spindle until the imaginary straight line passing through the cutting centers 1*d* and 1*e* coincides with the axis 52 of the holding arm 161. Then, the unit for holding the raw wood is changed from the centering spindle to the holding arm 161 (see FIG. 24).

Then, the motor 74 for the support member 51 is again revolved so that the support member 51 is moved in the direction opposite to that in the above-mentioned process. Thus, the holding arm 161 is moved to the spindles 71 of the veneer lathe. Simultaneously, the length of the holding arm 161 is adjusted so that the operation is continued until the two cutting centers 1*d* and 1*e* of the raw wood coincide with axes of the spindles 71 (see FIG. 25).

Since the present invention has the above-mentioned structure, the structure of an apparatus for correcting the position of the cutting centers of raw wood can be simplified. Moreover, the manufacturing cost can be reduced.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A lathe charger comprising:

a pair of centering spindles for holding end surfaces of raw wood, said pair of centering spindles comprises a first centering spindle which rotates, moves in an axial direction, and moves perpendicular to said axial direction and a second centering spindle, positioned opposite to said first centering spindle, which rotates and moves in an axial direction;

profile sensors positioned in said lathe charger for detecting the raw wood;

a sensor for sensing a rotational angle of said centering spindles;

centering means for automatically calculating cutting centers of the two end surfaces of the raw wood held by the pair of said centering spindles in accordance with the signals supplied from said profile sensors and said rotational-angle sensor;

said centering means comprises a movable frame mounted on guide members, having said first centering spindle mounted thereon, said movable frame reciprocating in a direction perpendicular to the direction of the axial direction of said first centering spindle;

a pair of holding arms for holding the raw wood in place of said pair of said spindles;

means for moving said holding arms in such a manner as to move said pair of holding arms between said centering spindles and spindles of a veneer lathe for an arbitrary distance, wherein said pair of said holding arms can be extended/contracted and one of said pair of said centering spindles is structured to be capable of moving in a direction which intersects a direction in which said pair of said holding arms are extended/contracted when viewed from a side of said end surface of said raw wood;

a control mechanism is provided wherein when one of the end surfaces is viewed in parallel with the axis of said centering spindles in a state in which the raw woods, having cutting centers of the two end surfaces which have been calculated, is held, one of said pair of centering spindles being structured to be capable of moving until an imaginary straight line passing through the two coincident cutting centers is made to be in parallel with the direction in which said holding arms are extended/contracted at the position at which said holding arms hold the raw wood;

members for holding the raw wood are changed from said centering spindles to said holding arms at the position to which said centering spindle has been moved; and said holding arms are extended/contracted and said holding arms are moved to said spindles of said veneer lathe by said means for moving said holding arms so that the two cutting centers and the axes of said spindles of said veneer lathe are made to coincide with each other.

2. A lathe charger according to claim 1, wherein said means for moving said holding arms is a rotating mechanism arranged to be rotated about a rotational shaft thereof, and the imaginary straight line passes through the axis of the rotational shaft when one of the end surfaces is viewed in parallel with the axis of said centering spindles.

3. A lathe charger according to claim 1, wherein said means for moving said holding arms is a moving mechanism comprising rails for movement, and the imaginary straight line passes through the axis of said holding arms when one of the end surfaces is viewed in parallel with the axis of said centering spindles.

* * * * *